(12) United States Patent
Hosokawa et al.

(10) Patent No.: US 11,606,552 B2
(45) Date of Patent: Mar. 14, 2023

(54) VIDEO ENCODING DEVICE, OPERATING METHODS THEREOF, AND VEHICLES EQUIPPED WITH A VIDEO ENCODING DEVICE

(71) Applicant: RENESAS ELECTRONICS CORPORATION, Tokyo (JP)

(72) Inventors: Maiki Hosokawa, Tokyo (JP); Toshiyuki Kaya, Tokyo (JP); Tetsuya Shibayama, Tokyo (JP); Seiji Mochizuki, Tokyo (JP); Tomohiro Une, Tokyo (JP); Kazushi Akie, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 0 days.

(21) Appl. No.: 17/380,599

(22) Filed: Jul. 20, 2021

(65) Prior Publication Data

US 2021/0352278 A1    Nov. 11, 2021

Related U.S. Application Data

(62) Division of application No. 16/662,182, filed on Oct. 24, 2019, now Pat. No. 11,102,475.

(30) Foreign Application Priority Data

Dec. 18, 2018    (JP) .............................. JP2018-236818

(51) Int. Cl.
*H04N 19/105*    (2014.01)
*H04N 19/139*    (2014.01)
(Continued)

(52) U.S. Cl.
CPC ....... *H04N 19/105* (2014.11); *H04N 5/23229* (2013.01); *H04N 19/139* (2014.11); *H04N 19/146* (2014.11); *H04N 19/172* (2014.11)

(58) Field of Classification Search
None
See application file for complete search history.

(56) References Cited

U.S. PATENT DOCUMENTS 7,257,262 B2    8/2007 Yamamoto et al.
8,194,736 B2 *  6/2012 Youn .................... H04N 19/433
                                                375/240.12
(Continued)

FOREIGN PATENT DOCUMENTS

| JP | 2004-266731 A | 9/2004 |
| JP | 2009-260977 A | 11/2009 |
| WO | 2008/136178 A1 | 11/2008 |

OTHER PUBLICATIONS

U.S. PTO Notice of Allowance issued in related parent U.S. Appl. No. 16/662,182, dated May 3, 2021.
(Continued)

*Primary Examiner* — Chikaodili E Anyikire
(74) *Attorney, Agent, or Firm* — McDermott Will & Emery LLP

(57) ABSTRACT

A video encoding device includes a local decode generation unit for generating a reference image based on a result of encoding of a divided image, a compression unit for compressing the reference image to generate a compressed data, a reference image storage determination unit for determining whether to store the compressed data in a memory, and an inter-prediction unit for performing motion vector search for inter-coding based on a reference image stored in the memory. The reference image storage determination unit sets an allowable data amount used for storing the reference image for each determined area of the moving image data, and determines whether or not to store the compressed data obtained by compressing the reference image in the memory based on the allowable data amount. Inter-prediction unit sets the reference image corresponding to the compressed
(Continued)

data stored in the memory as the search range of motion vector search.

2 Claims, 20 Drawing Sheets

(51) Int. Cl.
  *H04N 19/146* (2014.01)
  *H04N 19/172* (2014.01)
  *H04N 5/232* (2006.01)

(56) References Cited

U.S. PATENT DOCUMENTS

| | | | | |
|---|---|---|---|---|
| 9,300,984 | B1 | 3/2016 | Ostiguy | |
| 9,536,323 | B2 | 1/2017 | Okamoto | |
| 10,743,023 | B2 | 8/2020 | Morigami et al. | |
| 2007/0025443 | A1* | 2/2007 | Inokuma | H04N 19/428 375/240.26 |
| 2010/0098166 | A1 | 4/2010 | Budagavi et al. | |
| 2010/0316123 | A1 | 12/2010 | Inokuma | |
| 2011/0051815 | A1 | 3/2011 | Lee | |
| 2011/0150350 | A1 | 6/2011 | Saitoh et al. | |
| 2012/0188375 | A1* | 7/2012 | Funabashi | H04N 19/105 375/240.03 |
| 2012/0300836 | A1* | 11/2012 | Shimizu | H04N 19/15 375/E7.243 |
| 2012/0321208 | A1* | 12/2012 | Uematsu | H04N 19/109 382/238 |
| 2015/0312574 | A1* | 10/2015 | Ying | H04N 19/105 345/212 |
| 2016/0007025 | A1* | 1/2016 | Kaya | H04N 19/12 375/240.13 |
| 2016/0277767 | A1* | 9/2016 | Le Pendu | H04N 19/50 |
| 2018/0020220 | A1 | 1/2018 | Leontaris et al. | |
| 2019/0289286 | A1 | 9/2019 | Kitamura et al. | |
| 2019/0297344 | A1 | 9/2019 | Holland et al. | |
| 2019/0306510 | A1 | 10/2019 | Chen et al. | |
| 2020/0169729 | A1 | 5/2020 | Xu et al. | |
| 2020/0195918 | A1 | 6/2020 | Hosokawa et al. | |
| 2020/0374542 | A1 | 11/2020 | Zhang et al. | |

OTHER PUBLICATIONS

U.S. PTO Non-Final Office Action issued in related parent U.S. Appl. No. 16/662,182, dated Dec. 2, 2020.
U.S. Appl. No. 16/662,182, filed Oct. 24, 2019.
Tomita Y. et al., "Error resilient modified inter-frame coding system for limited reference picture memories", Proceedings of the Picture Coding Symposium, XX, XX, No. 143, Sep. 10, 1997, pp. 743-748.
Chih-Chang Chen et al., "Size-controllable memory reduction scheme of storing reference frames at H.264/AVC under I, P and B", Multimedia and Expo (ICME), 2010 IEEE International Conference On, IEEE, Jul. 19, 2010, pp. 802-807.
Stefano Tubaro et al., "Coding local and global binary visual features extracted from video sequences", 110. MPEG Meeting; Oct. 20-24, 2014; Strasbourg; (Motion Picture Expert Group or ISO/IEC JTC1/SC29/WG11), No. m35016, Oct. 20, 2014.
Nejmeddine Bahri et al., "Fast intra mode decision algorithm based on inter prediction mode for H264/AVC", Electrotechnical Conference (MELECON), 2012 16th IEEE Mediterranean, IEEE, Mar. 25, 2012, pp. 848-851.
Extended European Search Report issued in corresponding European Patent Application No. 19211101.1-1208, dated Apr. 20, 2020.
Japanese Notice of Reasons for Refusal issued in corresponding Japanese Patent Application No. 2018-236818, dated Aug. 16, 2022, with English translation.

* cited by examiner

MB : MACROBLOCK
MBL : MACROBLOCK LINE

▨ : MB COMPRESSED AND STORED IN MEMORY
▢ : MB TO BE COMPRESSED AND STORED IN MEMORY
□ : MB BEFORE STORING IN MEMORY

BECAUSE AREA UNABLE TO STORE REFERENCE IMAGE IN FRAME 2, EXPAND INTRA REFRESH AREA

- AREA UNABLE TO STORE REFERENCE IMAGE
- AREA ABLE TO STORE REFERENCE IMAGE
- INTRA REFRESH AREA

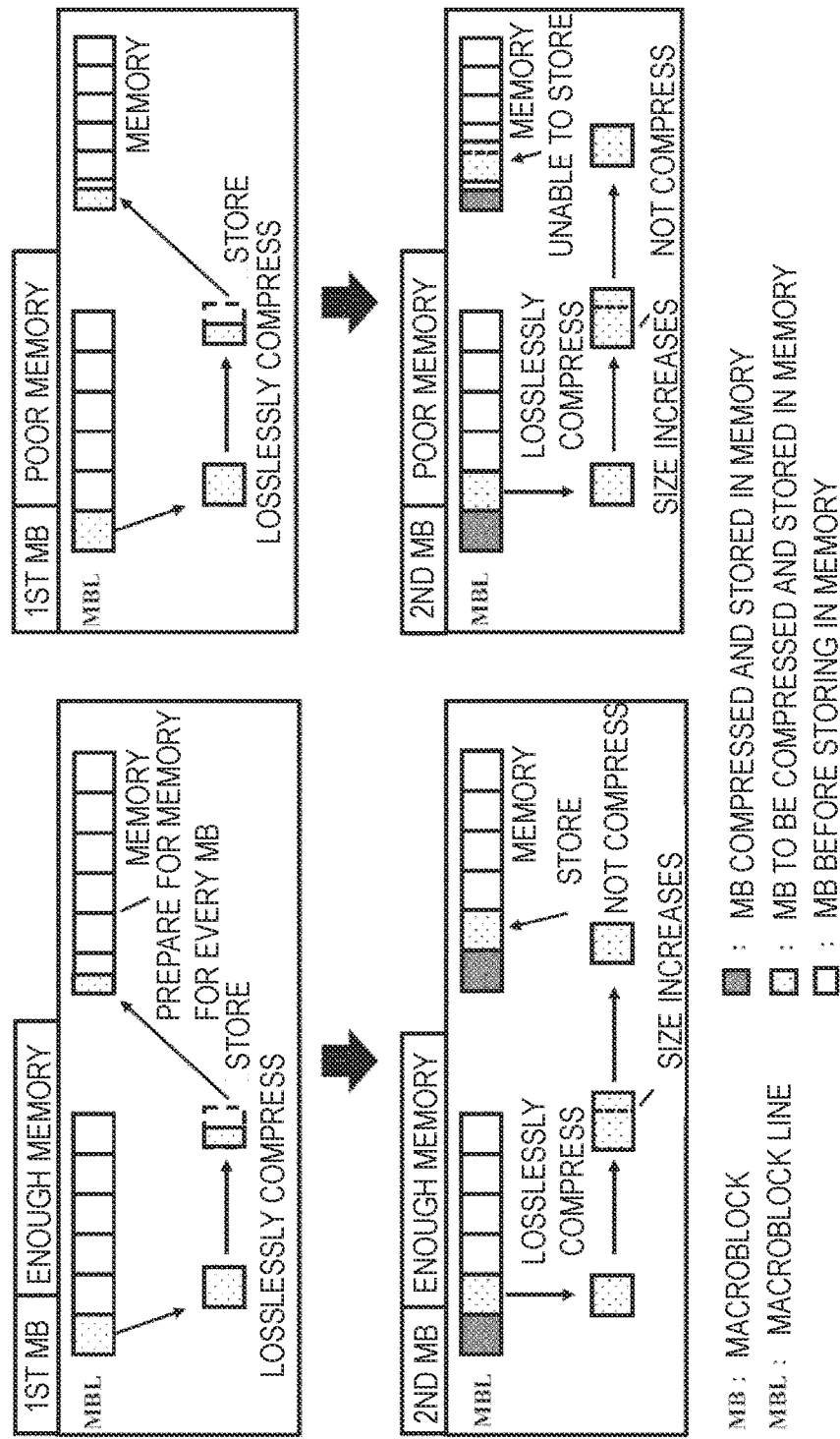

VIDEO ENCODING DEVICE, OPERATING METHODS THEREOF, AND VEHICLES EQUIPPED WITH A VIDEO ENCODING DEVICE

CROSS-REFERENCE TO RELATED APPLICATIONS

This is a Divisional of U.S. patent application Ser. No. 16/662,182, filed on Oct. 24, 2019, which claims the benefit of Japanese Patent Application No. 2018-236818, filed on Dec. 18, 2018 including the specification, drawings and abstract are incorporated herein by reference in their entirety.

BACKGROUND

The present invention relates to a vehicle equipped with a video encoding device and its operation method, and a vehicle equipped with a video encoding device, for example, the present invention relates to a video encoding device suitable for compressing image data, its operation method, and a vehicle equipped with a video encoding device.

The Background of the Invention

The image has an enormous amount of information, whereas the image has a strong correlation between pixels located close to each other in the same frame or between neighboring frame's located at the same coordinate in the frame, so that the code amount is compressed by using the correlation. For example, as typical international standards, methods for compressing and encoding and decoding video such as MPEG-2(ITU-T Rec. H. 262|ISO/IEC 13818-2 and MPEG-4(ISO/IEC 14496-2, H. 264 (ITU-T Rec. H. 264| ISO/IEC 14496-10) and H. 265 (ISO/IEC 23008-2 HEVC) are standardized. In these coding schemes, prediction coding is employed to reduce code amount, and when coding, the difference between a predicted image by a certain method (predicted image) and input image is coded. Conversely, at the time of decoding, a decoded image is obtained by adding a difference to predicted image.

The encoding processing described above is performed for each video screen (frame or field), and blocks obtained by subdividing the screen are units of processing.

Predicted image generation methods are roughly classified into two types. One is a method of performing prediction in the same screen using a single frame (intra-prediction, intra-frame prediction, or intra-screen prediction). The other is a technique (inter-prediction, inter-frame prediction, or inter-screen prediction) in which prediction is performed by using a frame that differs from the frame to be coded.

In inter-coding (inter-frame prediction coding), the video encoding device orthogonally transforms the difference between the original image of the inputted coding target frame and the inter-predicted image, quantizes the result, encodes the variable length, and transmits the result. On the other hand, the video encoding device performs inverse quantization and inverse orthogonal transform on the result of the quantization process to generate a reference image (locally decoded image) and stores the reference image in the reference frame memory for use as a predicted image in the subsequent inter-coding. That is, the video encoding device writes the reference image corresponding to the respective images of the encoded streams to the memory via the write bus, and reads another reference image written to the memory via the read bus, and encodes the image to be encoded by using it as reference image for inter-prediction.

As described above, the inter-coding requires memories for storing reference image. In this regard, a video coding technique in which a memory capacity usable as a reference image memory is limited is disclosed in Japanese unexamined Patent Application publication No. 2004/266731. The video encoding device described in Japanese unexamined Patent Application publication No. 2004/266731 determines the maximum number of macroblocks for inter-coding within one image frame based on the memory capacity that can be used as a reference image memory, and determines the macroblock positions for intra-coding and inter-coding at the following frame based on image data and code amount at the time of the current image code. Furthermore, the video encoding device described in Japanese unexamined Patent Application publication No. 2004/266731 reduces reference image memory by storing reference image in reference image memory only for macroblock positions that are decided to inter-coding in the following frame.

In connection with the above problems, a method and a device for compressing video data to smaller sizes and incorporating additional information into a compressed data using a combination of lossy compression and lossless compression are disclosed in Japanese unexamined Patent Application publication No. 2009/260977.

SUMMARY

Since the compression efficiency of inter-coding is generally higher than the compression efficiency of intra-coding, when the ratio of inter-coding is small, the image quality deteriorates at the same compression ratio. In the video encoding device described in Japanese unexamined Patent Application publication No. 2004/266731, since the maximum number of macroblocks coded by inter-coding is determined in advance, if the reference image memory is small, the maximum macroblock number inter-coding is small. Therefore, there has been a problem that coding efficiency is deteriorated, and image quality is deteriorated.

On the other hand, in the encoder described in Japanese unexamined Patent Application publication No. 2009/260977, if the amount of data after compression is within a predetermined allowable range, lossless compression is performed, and if it is outside the allowable range, lossy compression is performed. Further, in the encoder described in Japanese unexamined Patent Application publication No. 2009/260977, when it is determined that noise is large at the time of lossy compression, the encoder is not compressed. That is, as shown in the processing of the second MB in FIG. 20, in the encoder disclosed in Japanese unexamined Patent Application publication No. 2009/260977, the maximum data size stored in the memory is the data size at the time of non-compression. For this reason, in the encoder described in Japanese unexamined Patent Application publication No. 2009/260977, a memory capacity corresponding to the data size at the time of uncompression is secured as a memory capacity that can be used for one macroblock.

As shown in FIG. 20, when the memory size is large, the reference image of all the macroblock can be stored in the memory without being compressed. However, as shown in FIG. 20, when the memory capacity is small, the encoders described in Japanese unexamined Patent Application publication No. 2009/260977 cannot secure the memory capacity corresponding to the data size at the time of uncompression for all the macroblock. Therefore, it is difficult to apply the art disclosed in Japanese unexamined Patent Application publication No. 2009/260977 to a device in which a video can be encoded using a small-capacity memory.

It is an object of the present disclosure to provide a video encoding device capable of performing a high-quality encoding process using a small-capacity memory (e.g., an SRAM (Static Random Access Memory) memory). Other objects and novel features will become apparent from the description of the specification and the drawings.

Means of Solving the Problems

A video encoding device according to one embodiment includes an image encoding unit that performs prediction encoding by obtaining a difference between a divided image to be subjected to prediction encoding and a reference image, a local decode generation unit that generates a reference image based on an encoding result of the divided image, a compression unit that compresses the reference image to generate compressed data, an allowable data amount setting unit that presets an allowable data amount of compressed data stored in a memory for each determined area of video data, a reference image storage determination unit that determines whether or not to store compressed data in a memory, and an inter-prediction unit that performs motion vector search for inter-coding based on a reference image stored in the memory, wherein the reference image storage determination unit determines whether or not to store compressed data in the memory based on an allowable data amount and stores compressed data in the memory based on the determination result, the compressed data storage determination unit stores the compressed data in the memory. The reference image corresponding to the compressed data stored in the memory is defined as a search range for motion vector search.

An operation method of a video encoding device according to another embodiment is an operation method of a video encoding device comprising an image encoding unit that performs prediction coding by obtaining a difference between a divided image to be subjected to prediction encoding and a reference image, a local decode generation unit that generates a reference image based on an encoding result of the divided image, a compression unit that compresses the reference image to generate a compressed data, an allowable data amount setting unit that presets an allowable data amount of compressed data stored in a memory for each determined area of video data, a reference image storage determination unit that determines whether or not to store compressed data in the memory, and an inter-prediction unit that detects motion vector for inter-coding based on a reference image stored in the memory, wherein the reference image storage determination unit determines whether or not to store compressed data in the memory based on the allowable data amount, and the inter prediction unit stores compressed data in the memory based on the determination result that the reference image storage determination unit determines whether or not to store compressed data in the memory. The reference image corresponding to the compressed data stored in the memory is defined as a search range for motion vector search.

A vehicle according to another embodiment includes a camera for outputting video data, a video encoding device for inputting video data outputted from the camera, and a memory, the video encoding device includes an image encoding unit for performing prediction coding by determining a difference between a divided image to be subjected to prediction coding and a reference image, a local decode generation unit for generating a reference image based on an encoding result of the divided image, a compression unit for compressing a reference image to generate compressed data, an allowable data amount setting unit for setting an allowable data amount of compressed data stored in a memory for each region of the video data, a reference image storage determination unit for determining whether or not to store compressed data in the memory, and an inter-prediction unit for performing motion vector search for inter-coding based on the reference image stored in the memory; and a reference image storage determination unit for determining whether or not to store compressed data in the memory based on the allowable data amount. Based on the determination result that the compressed data is to be stored in the memory, the compressed data is stored in the memory, the inter-prediction unit sets the reference image corresponding to the compressed data stored in the memory as the search range for motion vector search, and the video encoding device sets the use amount of the memory to be variable in accordance with a driving mode.

According to one embodiment, the video encoding device may use small-capacity memories to perform high-quality encoding.

BRIEF DESCRIPTION OF THE DRAWINGS

FIG. 20 is a diagram showing an exemplary operation when the encoders according to the related art compress reference image.

DETAILED DESCRIPTION

Figure 1:
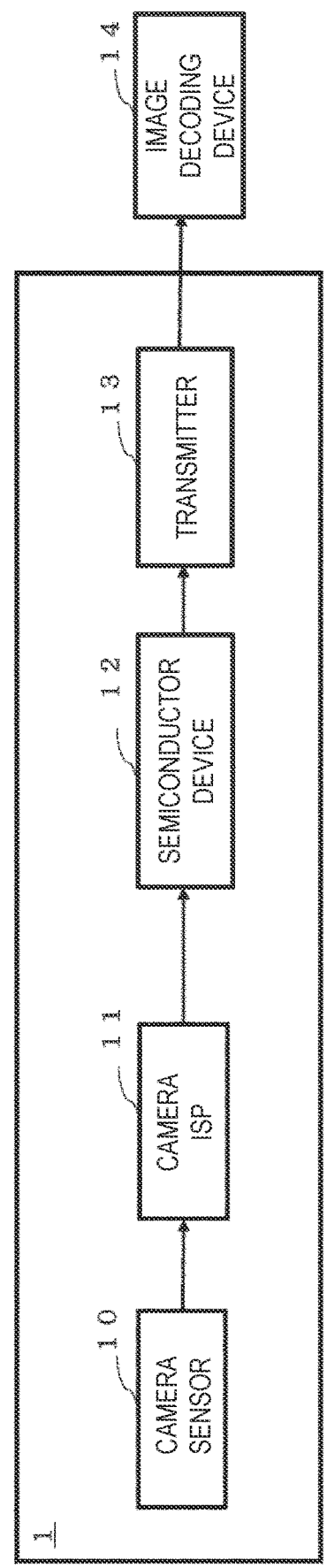
FIG. 1 is a block diagram showing an exemplary configuration of a camera module according to a first embodiment.

For clarity of explanation, the following description and drawings are appropriately omitted and simplified. In addition, the elements described in the drawings as functional blocks for performing various processes can be configured as CPUs (Central Processing Unit), memories, and other circuits in terms of hardware, and are realized by programs loaded into the memories in terms of software. Therefore, it is understood by those skilled in the art that these functional blocks can be realized in various forms by hardware alone, software alone, or a combination thereof, and the present invention is not limited to any of them. In the drawings, the same elements are denoted by the same reference numerals, and a repetitive description thereof is omitted as necessary.

Also, the programs described above may be stored and provided to a computer using various types of non-transitory computer readable media. Non-transitory computer readable media includes various types of tangible storage media. Examples of non-transitory computer-readable media include magnetic recording media (e.g., flexible disks, magnetic tapes, hard disk drives), magneto-optical recording media (e.g., magneto-optical disks), CD-ROM (Read Only Memory, a CD-R, a CD-R/W, solid-state memories (e.g., masked ROM, PROM (Programmable ROM), EPROM (Erasable PROM, flash ROM, RAM (Random Access Memory)). The program may also be supplied to the computer by various types of transitory computer-readable media. Examples of transitory computer-readable media include electrical signals, optical signals, and electromagnetic waves. The transitory computer readable medium may provide the program to the computer via wired or wireless communication paths, such as electrical wires and optical fibers.

First Embodiment

FIG. 1 is a block diagram showing an exemplary configuration of a camera module 1 according to the first embodiment. The camera module 1 according to the present embodiment is provided, for example, in the right front, the left front, the right rear, and the left rear of the vehicle, and captures an image of the periphery of the vehicle as a video. As shown in FIG. 1, the camera module 1 includes a camera sensor 10, a camera ISP (Image Signal Processor) 11, a semiconductor device 12 including a video encoding device, and a transmitter 13.

The camera sensor 10 is an image pickup device for picking up a peripheral video, and outputs the picked up video to the camera ISP 11.

The camera ISP 11 receives the data photographed by the camera sensor 10, adjusts the white balance, corrects the distortion, and converts the format of the data, and outputs a video to the semiconductor device 12. The processing performed by the camera ISP is not limited to the above examples, and may include various processing for video data.

The semiconductor device 12 includes a video encoding device. The semiconductor device 12 generates an encoded stream by encoding the inputted video to be encoded inputted from the camera ISP 11. The semiconductor device 12 outputs the generated bitstream to the transmitter 13.

The transmitter 13 transmits the bitstream to the video decoding device 14, which is external to the camera module 1, via a wired network or a radio network.

FIG. 1 is a block diagram showing an exemplary configuration of the camera module 1, and the block diagram may differ from the block diagram. For example, the camera ISP 11 may be included in the semiconductor device 12. A part of the transmitter 13 may be included in the semiconductor device 12.

Figure 2:
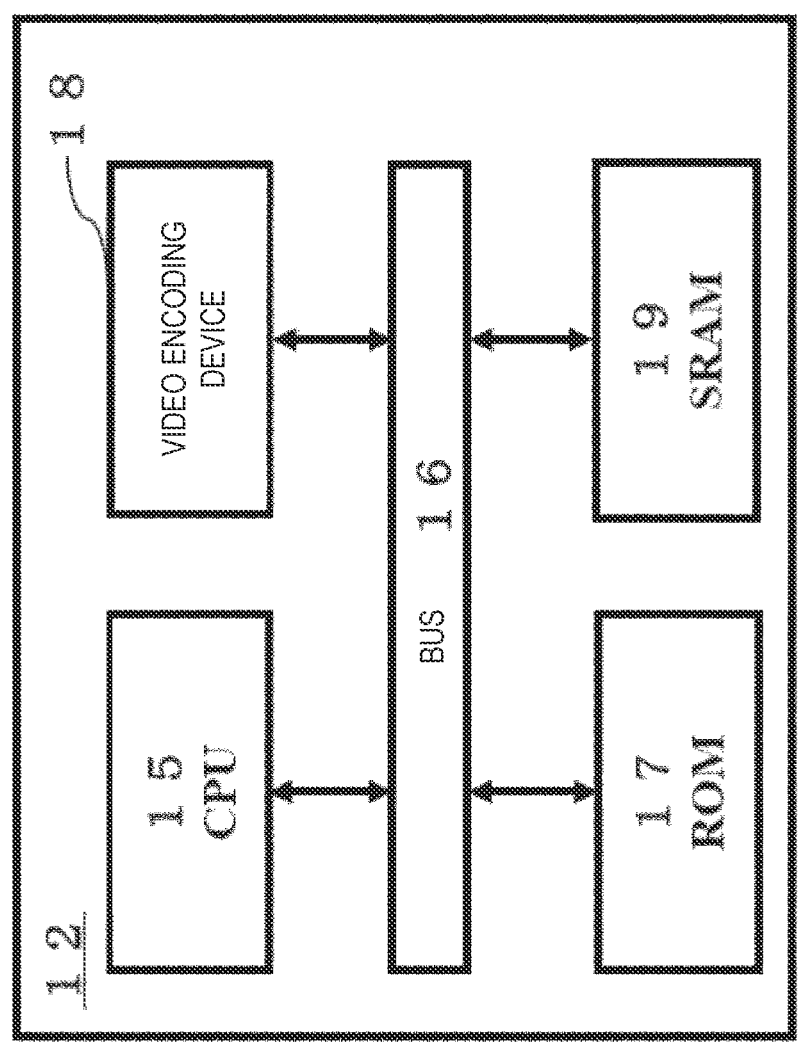
FIG. 2 is a block diagram showing an exemplary configuration of a semiconductor device including a video encoding device according to the first embodiment.

Next, FIG. 2 is a block diagram showing an exemplary configuration of the semiconductor device 12 including the video encoding device according to the first embodiment. As shown in FIG. 2, the semiconductor device 12 includes a CPU 15, a bus 16, a ROM 17, a video encoding device 18, and an SRAM 19.

The CPU 15 reads the programs stored in the ROM 17 via the bus 16 and executes instructions. The CPU 15 may execute programs to write settings to various control registers (not shown) that control the operation of the video encoding device 18, and may also read various registers, such as control registers, as well as status register indicating the process status of the video encoding device 18. The video encoding device 18 can write and read reference image to and from the SRAM 19 via the bus 16.

FIG. 2 is a block diagram showing an exemplary configuration of the semiconductor device 12, and the block diagram may differ from this block diagram. For example, in FIG. 2, the ROM 17 for storing the program executed by the CPU 15 is built in the semiconductor device 12, but a ROM for storing the program may be provided outside the semiconductor device 12.

Figure 3:
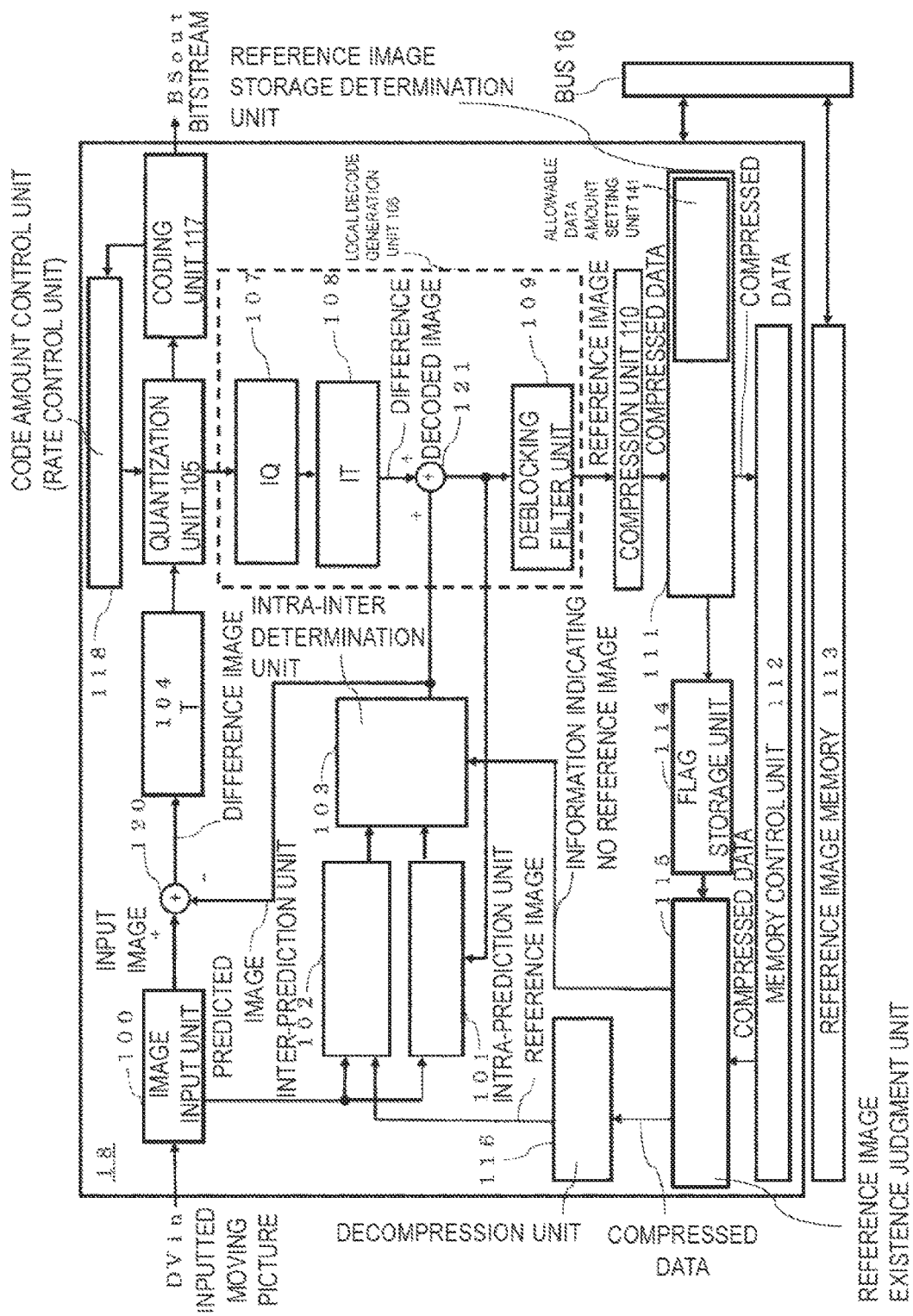
FIG. 3 is a block diagram showing an exemplary configuration of a video encoding device according to the first embodiment.

Next, FIG. 3 is a block diagram showing an exemplary configuration of the video encoding device 18. As shown in FIG. 3, the video encoding device 18 includes an image input unit 100, an intra-prediction unit 101, an inter-prediction unit 102, an intra-inter determination unit 103, an orthogonal transform unit (T) 104, a quantization unit 105, a local decode generation unit 106, a compression unit 110, a reference image storage determination unit 111, a memory control unit 112, a flag storage unit 114, a reference image existence judgment unit 115, a decompression unit 116, a coding unit 117, a code amount control unit 118, a subtractor 120, and an adder 121. The reference image memory 113 shown in FIG. 3 is provided as a part or the whole area of the SRAM 19.

The image input unit 100 receives the inputted video DVin. The image input unit 100 has a function of adjusting the difference between the frequency of the inputted video DVin and the operating frequency of the video encoding device 18. For example, image input unit 100 adjusts the frequency gap by providing a buffer to temporarily store inputted video DVin.

On the basis of the received inputted video DVin, the image input unit 100 divides the image to be subjected to prediction coding into blocks having sizes according to the International Standard of Video Coding, and transmits the blocks to the intra-prediction unit 101, the inter-prediction unit 102, and the subtractor 120.

The intra-prediction unit 101 calculates the intra-coding costs required to perform intra-coding of the input image and transmits them to the intra-inter determination unit 103. Further, the intra-prediction unit 101 transmits an intra-predicted image used for intra-prediction to the intra-inter determination unit 103.

The inter-prediction unit 102 performs motion estimation. In addition, the inter-prediction unit 102 calculates inter-coding costs required for inter-coding using the difference between input image and reference image based on the result of motion estimation. In order to calculate the inter-coding costs, the inter-prediction unit 102 sets the reference image obtained by decompressing the compressed data by the decompression unit 116 as the search range of the motion vector search. Further, the inter-prediction unit 102 transmits, as an inter-predicted image used for inter-prediction, a reference image at which inter-coding costs are minimized to the intra-inter determination unit 103.

The intra-inter determination unit 103 determines whether to perform intra-coding or inter-coding on the basis of the intra-coding cost transmitted from the intra-prediction unit 101, the inter-coding cost transmitted from the inter-prediction unit 102, and reference image existence information transmitted from the reference image existence judgment unit with respect to the divided images targeted for prediction coding. The intra-inter determination unit 103 transmits the selected predicted image to the subtractor 120 in accordance with the determined predictive modes.

The subtractor 120 calculates a difference between input image and predicted image transmitted from the intra-inter determination unit 103.

The orthogonal transform unit (T) 104 performs an orthogonal transform process such as DCT (Discrete Cosine Transform) or DST (Discrete Sine Transform) on the difference image between input image and predicted image outputted by the subtractor 120. For example, if the orthogonal transform of the orthogonal transform unit (T) 104 is DCT, the orthogonal transform unit (T) 104 calculates DCT coefficients and transmits them to the quantization unit 105.

The quantization unit 105 performs quantization processing on the result of the orthogonal transform processing by the orthogonal transform unit (T) 104. For example, if the orthogonal transform of the orthogonal transform unit (T) 104 is DCT, the quantization unit 105 quantizes the DCT coefficients outputted from the orthogonal transform unit (T) 104.

The local decode generation unit 106 includes an inverse quantization unit (IQ) 107, an inverse orthogonal transform unit (IT) 108, an adder 121, and a deblocking filter unit 109. The local decode generation unit 106 generates a reference image based on the quantization result transmitted from the quantization unit 105 and the predicted image, and outputs it to the compression unit 110.

The inverse quantization unit (IQ) 107 performs inverse quantization processing on the quantization processing result by the quantization unit 105. The inverse orthogonal transform unit (IT) 108 performs an inverse orthogonal transform process on the result of the inverse quantization process by the inverse quantization unit (IQ) 107. For example, if the orthogonal transform of the orthogonal transform unit (T) 104 is DCT, the inverse quantization unit (IQ) 107 performs inverse quantization on the quantized DCT coefficients. The inverse orthogonal transform unit (IT) 108 outputs difference decoded image by performing inverse DCT on the DCT coefficients dequantized by the inverse quantization unit (IQ) 107.

The adder 121 adds the difference decoded image transmitted from the inverse orthogonal transform unit (IT) 108 and the predicted image, and outputs the addition result to the deblocking filter unit 109.

The deblocking filter unit 109 performs a deblocking filtering process on the addition result of the adder 121 to generate reference image. When filtering is off in the deblocking filter unit 109, the addition result of the adder 121 is directly outputted as reference image from the deblocking filter unit 109. When filtering is on in the deblocking filter unit 109, the result of deblocking filtering of the addition result of the adder 121 is outputted from the deblocking filter unit 109 as reference image.

The compression unit 110 losslessly compresses the reference image received from the local decode generation unit 106 and outputs it to the reference image storage determination unit 111.

The reference image storage determination unit 111 determines whether or not to store the compressed data (sometimes referred to as "compressed data of reference image") of the reference image received from the compression unit 110 in the reference image memory 113. When storing the compressed data in the reference image memory 113, the reference image storage determination unit 111 requests the memory control unit 112 to write to the reference image memory 113, and transmits the compressed data. The reference image storage determination unit 111 includes an allowable data amount setting unit 141, and the allowable data amount setting unit 141 will be described later with reference to FIG. 4.

The flag storage unit 114 stores a flag indicating whether or not compressed data has been stored in the reference image memory 113 based on the determination result of the reference image storage determination unit 111.

The memory control unit 112 performs control for writing compressed data to the reference image memory 113 and control for reading compressed data from the reference image memory 113 based on requests from the respective units of the video encoding device 18. More specifically, the memory control unit 112 accesses the reference image memory 113 in the SRAM by reading or writing via the bus 16.

The reference image memory 113 is a storage device for storing compressed data obtained by compressing reference image.

The reference image existence judgment unit 115 reads information about the presence or absence of a reference image stored in the flag storage unit 114. If the compressed data of the reference image is stored in the reference image memory 113, the reference image existence judgment unit 115 requests the memory control unit 112 to read the reference image. Based on the request, the memory control unit 112 reads the compressed data of the reference image from the reference image memory 113, and transmits the compressed data to the decompression unit 116 via the reference image existence judgment unit 115.

The decompression unit 116 performs decompression processing on the compressed data of the reference image read from the reference image memory 113, and transmits reference image as a result of the decompression processing to the inter-prediction unit 102.

The coding unit 117 generates a bitstream BSout by performing an encoding process on the result of the quantization process of the quantization unit 105.

The code amount control unit 118 adjusts the quantization scale based on the code amount generated by the coding unit 117 and transmits the adjusted quantization scale to the quantization unit 105.

Figure 4:
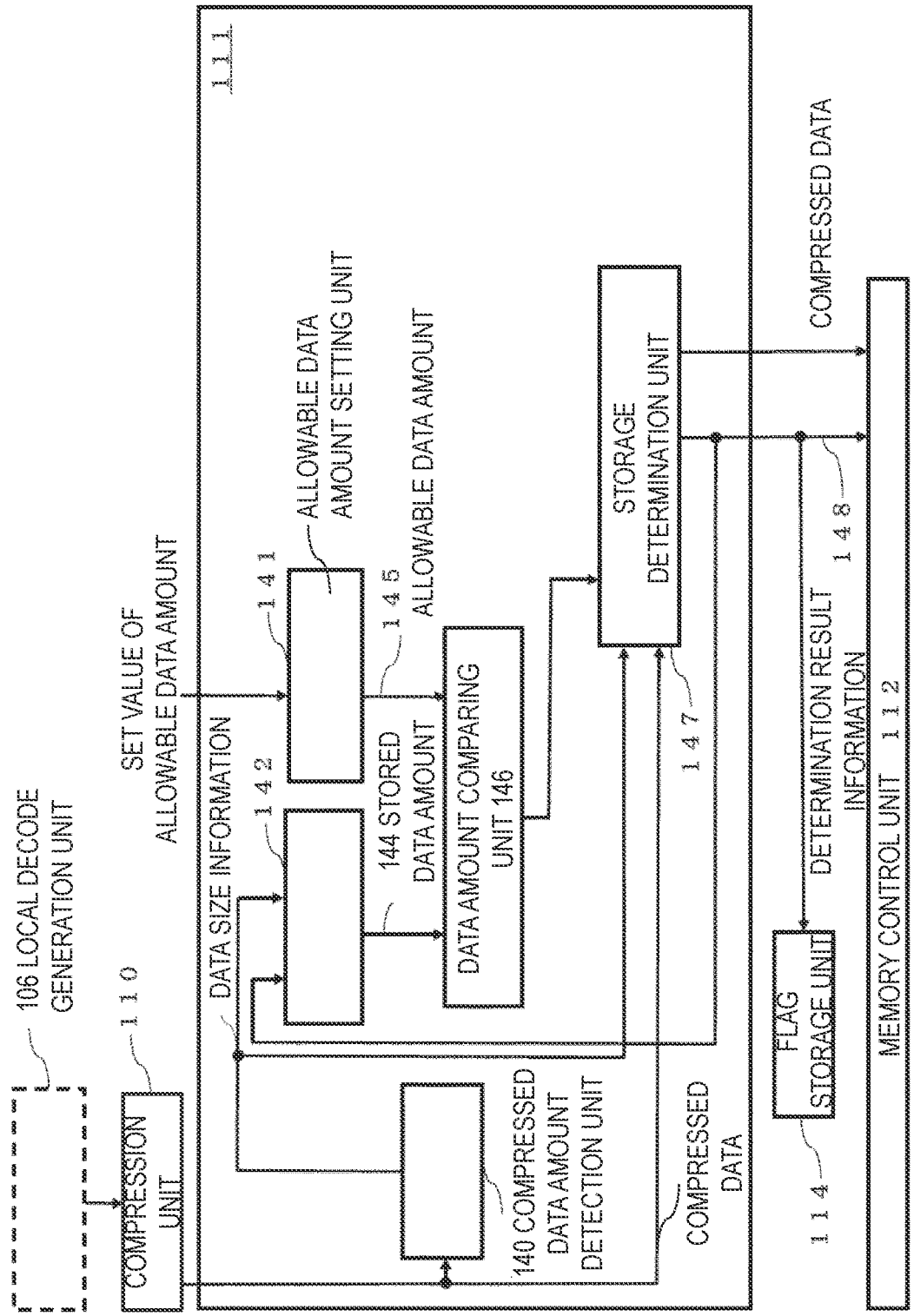
FIG. 4 is a block diagram showing an exemplary configuration of a reference image storage determination unit according to the first embodiment.

FIG. 4 is a block diagram showing an exemplary configuration of the reference image storage determination unit 111. As shown in FIG. 4, the reference image storage determination unit 111 includes a compressed data amount detection unit 140, an allowable data amount setting unit 141, a stored data amount calculating unit 142, a data amount comparing unit 146, and a storage determination unit 147.

The compressed data amount detection unit 140 calculates the data size of the compressed data transmitted from the compression unit 110.

The allowable data amount setting unit 141 presets the allowable data amount of the compressed data to be stored in the reference image memory 113 for each predetermined area (hereinafter, sometimes referred to as "unit area") in the input image. For example, the allowable data amount setting unit 141 is composed of a writable register, and the CPU 15 is set by executing the drivers of the video encoding device 18.

The unit area can be arbitrarily set. For example, the unit area may be one macroblock line of the MPEG, two macroblock lines, or one coding unit line.

The allowable data amount 145 can also be arbitrarily set. For example, a value obtained by dividing the available memory capacity by the number of macroblock lines included in one frame of the inputted video DVin can be set in the allowable data amount setting unit 141 as the allowable data amount 145.

The stored data amount calculating unit 142 adds the amount of data stored in the reference image memory 113 (hereinafter, referred to as the "stored data amount") and the data size of the compressed data detected by the compressed data amount detection unit 140 for the unit area, and transmits the result of the addition as the stored data amount 144 to the data amount comparing unit 146. Since the stored data amount 144 is calculated for each unit area, the stored data amount calculating unit 142 is initialized each time the process of the unit area is started. That is, when the processing of the unit area is started, the stored data amount is initialized to zero.

The data amount comparing unit 146 compares the allowable data amount 145 set in the allowable data amount setting unit 141 with the stored data amount 144 transmitted from the stored data amount calculation unit 142, and transmits the comparison result to the storage determination unit 147.

The storage determination unit 147 determines whether or not to store compressed data in the reference image memory 113 based on the comparison result of the data amount comparing unit 146. If the stored data amount 144 is less than or equal to the allowable data amount 145, the storage determination unit 147 sends a determination result information 148 to the memory control unit 112, the flag storage unit 114, and the stored data amount calculating unit 142 to allow the compressed data to be stored in the reference image memory 113. If the storage determination unit 147 determines that the compressed data of the reference image is to be stored in the reference image memory 113, it also transmits the data size information of the data to be stored to the flag storage unit 114. The stored data amount calculating unit 142 holds and stores the stored data amount corresponding to the information indicating that storage of the compressed data in the reference image memory 113 is permitted.

On the other hand, when the stored data amount 144 is larger than the allowable data amount 145, the storage determination unit 147 transmits, to the memory control unit 112, the flag storage unit 114, and the stored data amount calculating unit 142, a determination result information 148 indicating that the storage of the compressed data in the reference image memory 113 is not permitted based on the comparison result of the data amount comparing unit 146. The stored data amount calculating unit 142 holds and stores the stored data amount corresponding to the information indicating that the storage of the compressed data in the reference image memory 113 is not permitted.

Figure 5:
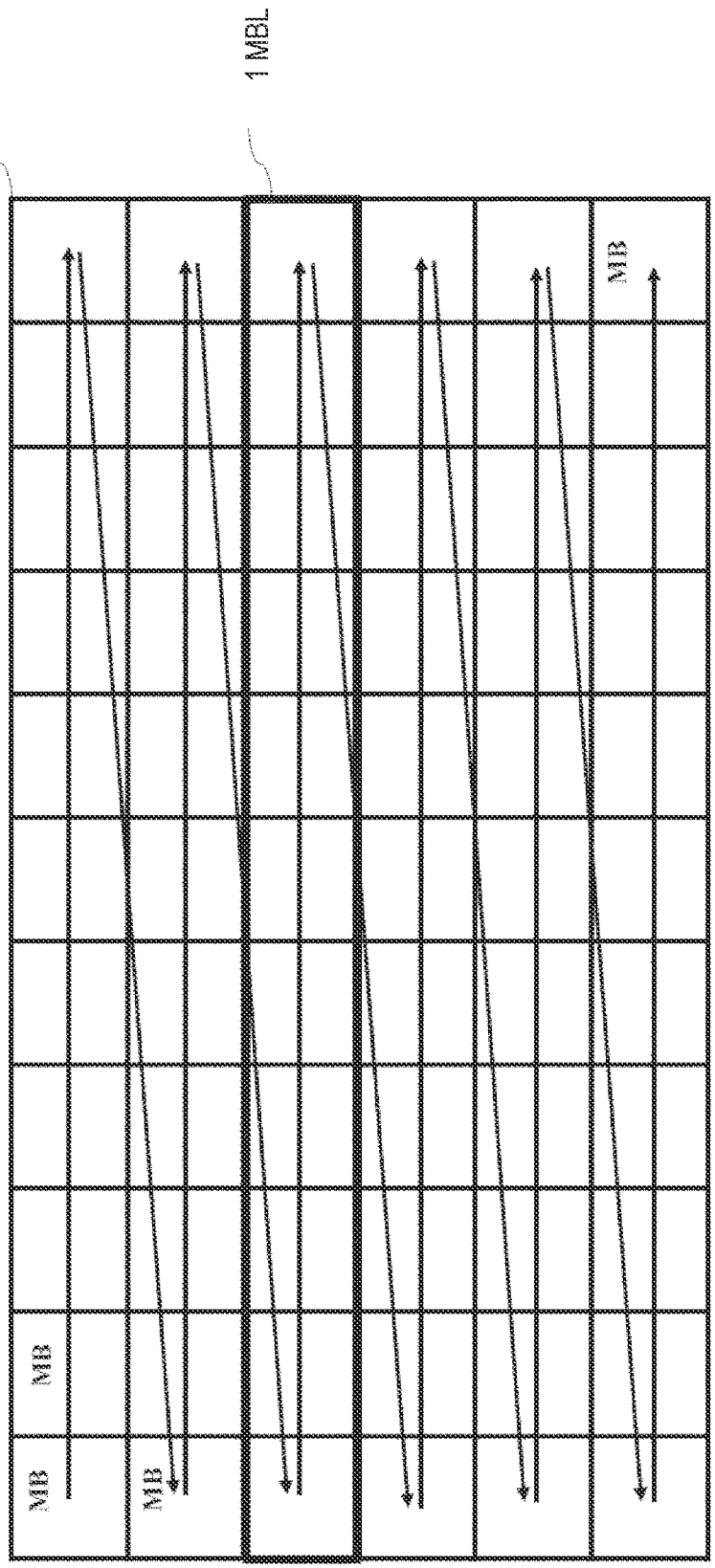
FIG. 5 is a diagram showing how the video encoding device according to the first embodiment divides an image of one frame into a plurality of images and encodes the divided images in a determined order.

Next, the operation of the video encoding device 18 will be described. FIG. 5 is a diagram showing how the video encoding device 18 according to the first embodiment divides an image of one frame into a plurality of images and encodes the divided images in a determined order. As shown in FIG. 5, the images in the frame are divided into a plurality of rectangular blocks. For example, in MPEG, it is usually divided into rectangular blocks called macroblock (MB) of 16 pixels×16 pixels, and encoding is performed for each macroblock. In one frame, the video encoding device 18 encodes the rectangular blocks in the order of the arrows from the upper left to the lower right. In the following, the divided image targeted for image prediction coding, i.e., the block to be coded, will be described as macroblock, but the unit of the block to be divided is not limited to the macroblock. For example, it may be a coding unit which is a unit of coding process when coding is performed in accordance with the HEVC standard. When the divided image is a macroblock, the region surrounded by a thick line by the rectangular blocks in the third row from the top in FIG. 5 corresponds to 1 macroblock line. Hereinafter, it is assumed that the unit area is 1 macroblock line.

Returning to FIG. 3, the encoding operation of the video encoding device 18 will be described. Image input unit 100 outputs the macroblock of the inputted video DVin to be coded to intra-prediction unit 101, inter-prediction unit 102, and the subtractor 120. Though the detailed operations of the intra-prediction unit 101 and the inter-prediction unit 102 will be described later, the calculated encoding costs and predicted image are transmitted to the intra-inter determination unit 103.

The intra-inter determination unit 103 determines whether to perform intra-coding or inter-coding for the macroblock to be coded based on the inputted coding costs. Then, the intra-inter determination unit 103 transmits the predicted image corresponding to the selected encoding method to the subtractor 120. The subtractor 120 calculates the difference between input image (macroblock to be coded) and predicted image, and transmits difference image to the orthogonal transform unit (T) 104.

The orthogonal transform unit (T) 104 performs an orthogonal transformation process on the subtraction result calculated by the subtractor 120, and outputs the orthogonal transformation result to the quantization unit 105. The quantization unit 105 performs quantization processing on the result of the orthogonal transform processing of the orthogonal transform unit (T) 104 in accordance with the quantization scale inputted from the code amount control unit 118.

The coding unit 117 generates a bitstream BSout by performing an encoding process on the result of the quantization process performed by the quantization unit 105.

Furthermore, the local decoding operation of the video encoding device 18 will be described with reference to FIG. 3. The local decode generation unit 106 performs inverse quantization by the inverse quantization unit (IQ) 107 and inverse orthogonal transform by the inverse orthogonal transform unit (IT) 108 on the result of the quantization process by the quantization unit 105 to generate a difference decoded image. The adder 121 adds the decoded difference image and predicted image. The deblocking filter unit 109 performs a deblocking filtering process on the addition result of the adder 121, generates reference image, and outputs it to the compression unit 110.

Next, lossless compression of reference image performed by the compression unit 110 shown in FIG. 3 will be described. The compression unit 110 receives reference image and losslessly compresses it to generate compressed data. Since the length of data after compression is variable in lossless compression, if a process is performed for each macroblock, the amount of data after compression may be increased from the amount of data before compression. In this instance, there is a possibility of overwriting the compressed data corresponding to the reference image that has not yet been read in the reference image memory 113. Therefore, in order to prevent overwriting of data, the present embodiment controls whether or not to store compressed data in the reference image memory 113 for each unit area.

Figure 6:
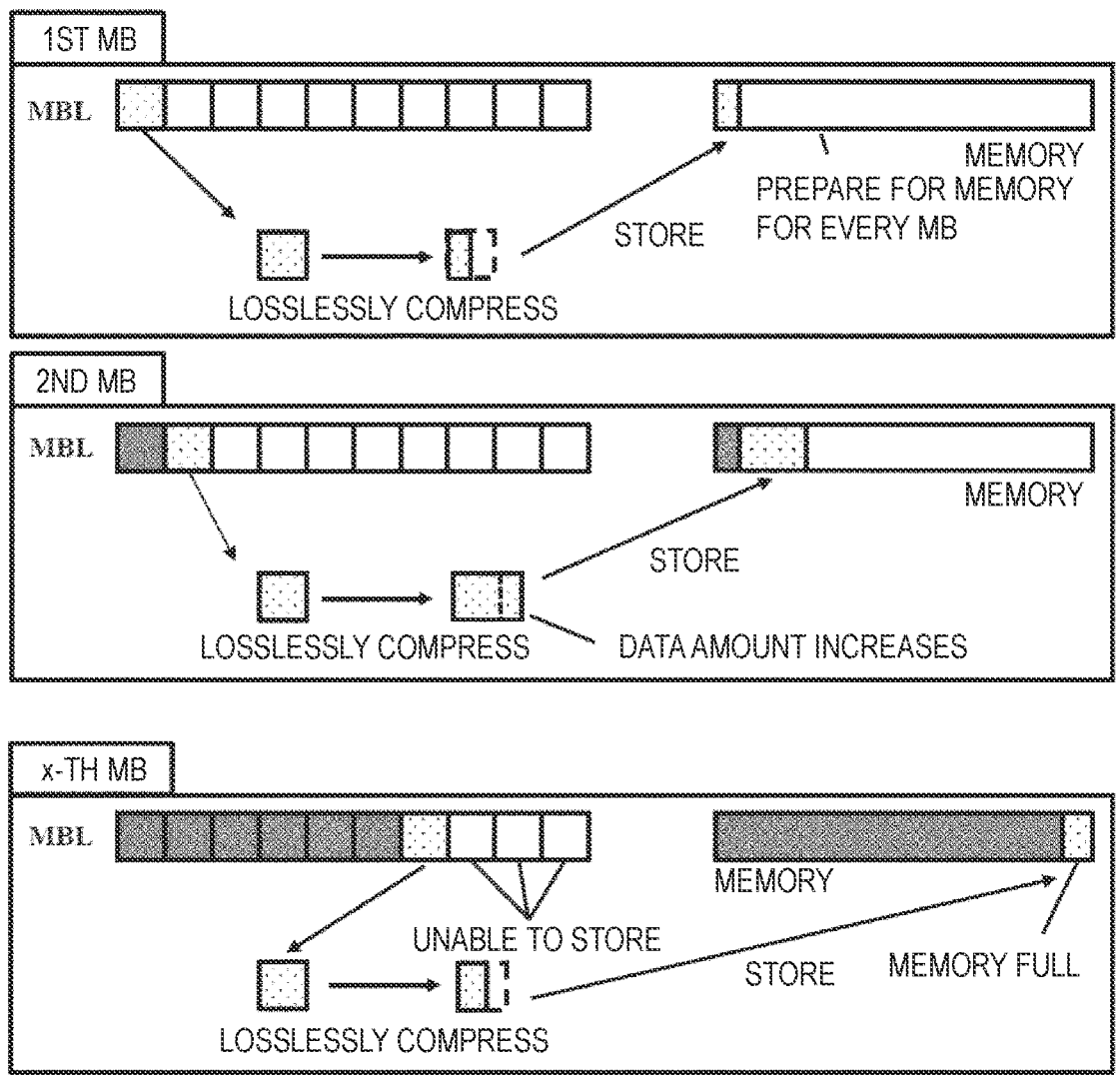
FIG. 6 is a diagram illustrating an exemplary operation of the video encoding device according to the first embodiment.

Next, with reference to FIG. 6, a store determination operation in the reference image memory will be described. The video encoding device 18 according to the present embodiment reversibly compresses the reference image for each macroblock, and stores compressed data obtained by compressing the reference image in the reference image memory 113. FIG. 6 shows an exemplary operation when the unit area is 1 macroblock line. As shown in FIG. 6, when the compression unit 110 compresses the reference image corresponding to the first macroblock (MB) of a macroblock line, the size of the compressed data is reduced from the original data size. However, when the compression unit 110 losslessly compresses the reference image corresponding to the second MB, the size of the compressed data is increased from the original data size. However, since the present embodiment controls the amount of data to be written to the reference image memory 113 so as not to exceed the amount of data set by the allowable data amount setting unit 141 for each macroblock line, problems of overwriting of data do not occur. Next, when the compression unit 110 stores the compressed data corresponding to the xMB in the reference image memory 113, the memory amount set in the allowable data amount setting unit 141 is exhausted. For this reason, the reference image storage determination unit 111 determines that there is no remaining capacity of the reference image memory 113 for the subsequent MBs, and does not store the compressed data in the reference image memory 113.

Figure 7:
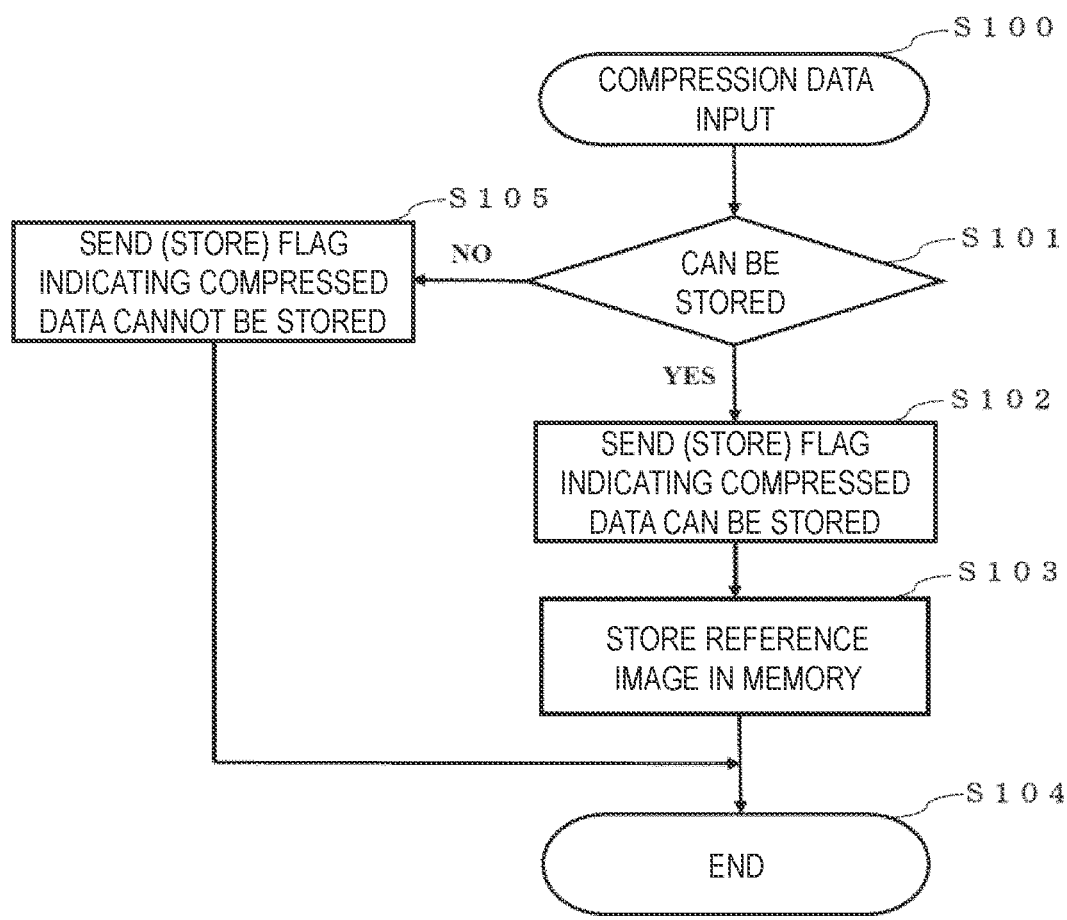
FIG. 7 is a flow chart showing an exemplary process of determining whether or not the reference image storage determination unit according to the first embodiment stores the compressed data obtained by compressing the reference image in the reference image memory.

FIG. 7 is a flow chart showing an exemplary process of determining whether or not the reference image storage determination unit 111 according to the present embodiment stores the compressed data obtained by compressing the reference image in the reference image memory 113. The reference image storage determination unit 111 receives the compressed data of the reference image from the compression unit 110 (step S100) and determines whether the compressed data can be stored in the reference image memory 113 (step S101). If there is free space in the reference image memory 113 (step S101:YES), the reference image storage determination unit 111 transmits a determination result information indicating that storage is possible to the flag storage unit 114. The flag storage unit 114 stores a flag (e.g., 1) indicating that the information is stored and the length information of the compressed data (step S102). The reference image storage determination unit 111 also sends a determination result information 148 to the memory control unit 112 indicating that it is ready to store. The memory control unit 112 stores the compressed data in the reference image memory 113 (step S103), and ends the process (step S104). When the capacity of the reference image memory 113 is insufficient (step S101:NO), the reference image storage determination unit 111 transmits a determination result information indicating that the storage is impossible to the flag storage unit 114. The flag storage unit 114 stores a flag (e.g., 0) indicating that storage is not possible (step S105), and ends the process (step S104).

Next, an intra-inter coding determination process will be described. As shown in FIG. 3, the image input unit 100 transmits input image to the intra-prediction unit 101 and the inter-prediction unit 102, respectively.

The intra-prediction unit 101 estimates the code amount when encoding the input image in a plurality of intra-modes. The intra-prediction unit 101 calculates a cost corresponding to the estimated code amount, and transmits the lowest cost as the lowest intra-coding cost to the intra-inter determination unit 103. The intra-prediction unit 101 further transmits the intra-prediction images to the intra-inter determination unit 103.

Figure 8:
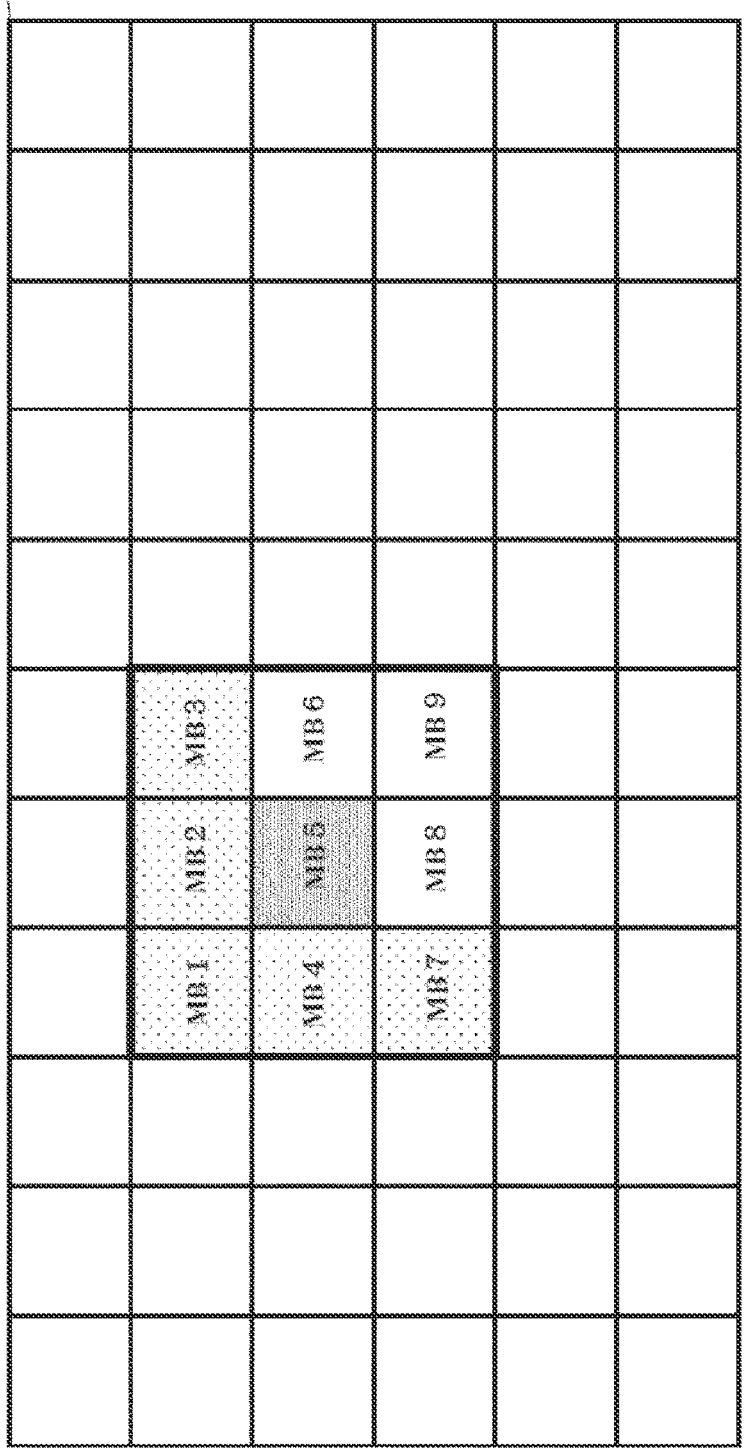
FIG. 8 is a diagram showing an exemplary search range when the inter-prediction unit according to the first embodiment performs the motion vector search.

On the other hand, the inter-prediction unit 102 needs the image data (reference image) of the frame prior to the current frame in order to detect the motion (difference) between the input image and the reference image. Therefore, the reference image existence judgment unit 115 checks whether or not reference image is stored in an area (searchable range) to which the macroblock to be coded can be referred. Then, the inter-prediction unit 102 sets the reference image of the searchable range corresponding to the compressed data stored in the reference image memory 113 as the search range of the motion vector search. This will be described in detail with reference to FIG. 8. FIG. 8 is a diagram showing the search range of the motion vector search of the inter-prediction unit 102 according to the present embodiment. In FIG. 8, the MB5 corresponds to the MB position to be coded. If searchable range is defined as, for example, up to 1 MB out of the MB of the coding position, the MB1-MB9 nine macroblock are searchable range at the time of encoding the MB5. In FIG. 8, the compressed data of reference image is stored in the reference image memory 113 for the six MBs of MB1-MB5 and MB7. On the other hand, for the three MBs of MB6 and MB8-MB9, the compressed data of reference image is not stored in the reference image memory 113. In the video encoding device 18 according to the present embodiment, the inter-prediction unit 102 receives only the reference image corresponding to the compressed data stored in the reference image memory 113. In the case of FIG. 8, the inter-prediction unit 102 receives only the MB1-MB5 and the MB7, and sets this as the search range of the motion vector search.

Figure 9:
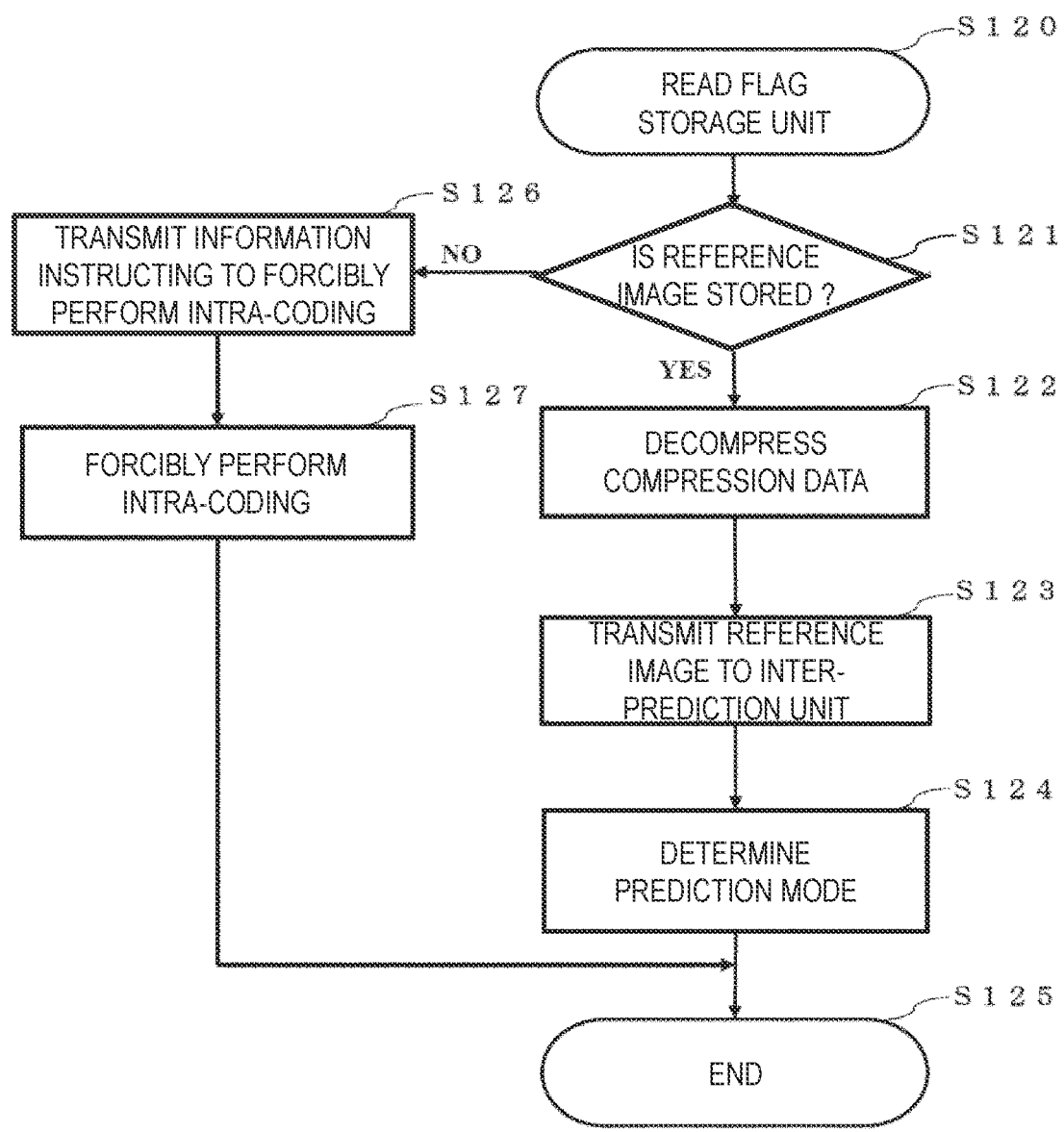
FIG. 9 is a flow chart showing an exemplary intra-inter coding determination process in the video encoding device according to the first embodiment.

FIG. 9 is a flow chart showing an exemplary intra-inter coding determination process in the video encoding device 18 according to the present embodiment. Since the inter-prediction unit 102 performs the motion vector search using the reference image, the reference image existence judgment unit 115 refers to the information stored in the flag storage unit 114, and reads out the information of the presence or absence of the reference image and the information of the macroblock that can be referred to within the scope of the searchable range (step S120). If reference image is stored in the reference image memory 113 (step S121), the reference image existence judgment unit 115 requests the memory control unit 112 to read from the reference image memory 113. The memory control unit 112 reads the compressed data requested to be read from the reference image memory 113, and transmits it to the reference image existence judgment unit 115. The reference image existence judgment unit 115 transmits the read compressed data to the decompression unit 116. The decompression unit 116 decompresses the received compressed data (step S122) and transmits it to the inter-prediction unit 102 (step S123). The number of reference image to be sent to the inter-prediction unit 102 is determined based on the searchable range and the state of the flags stored by the flag storage unit 114. The number of reference image transmitted to the inter-prediction unit 102 in the step S123 may be one or more, and may be more than one.

The inter-prediction unit 102 estimates the code amount at the time of inter-coding based on the difference between input image and reference image for each reference image included in the search range of the motion vector search, and calculates the inter-coding costs corresponding to the estimated code amount. The inter-prediction unit 102 further calculates a minimum inter-coding cost of the calculated one or more inter-coding costs and transmits the minimum inter-coding cost to the intra-inter determination unit. Further, the inter-prediction unit 102 transmits the inter-prediction image to the intra-inter determination unit 103.

The intra-inter determination unit 103 compares the minimum intra-coding cost and the minimum inter-coding cost, determines a prediction mode having a lower coding cost, transmits the inter-predicted image as predicted image to the subtractor 120 (step S124), and ends the intra-inter coding determination process (step S125).

On the other hand, if reference image is not stored in the reference image memory 113 within the scope of searchable range (step S121:NO), the reference image existence judgment unit 115 transmits to the intra-inter determination unit 103 an instruction to forcibly perform intra-coding (step S126). The intra-inter determination unit 103 receives information instructing forced intra-coding, decides to perform intra-coding of the macroblock to be coded, transmits the intra-predicted image as predicted image to the subtractor 120 (step S127), and ends the intra-inter coding determination process (step S125).

According to the first embodiment, the video encoding device 18 includes a compression unit 110 that losslessly compresses reference image to generate compressed data, an allowable data amount setting unit 141, and a reference image storage determination unit 111. Therefore, the reference image storage determination unit 111 can determine whether or not the compressed data obtained by compressing the reference image by the compression unit 110 is stored in the reference image memory 113 based on the allowable data amount set in the allowable data amount setting unit 141. Therefore, even when the memory capacity that can be used as the reference image memory 113 is small, the number of reference image stored in the reference image memory 113 can be increased in accordance with the compression result of the compression unit 110. As a result, the number of reference image stored in the reference image memory 113 can be maximized, and encoding can be performed while suppressing degradation in image quality caused by a small memory capacity.

Generally, in-vehicle camera module is waterproof because cameras are located outside the vehicle. Therefore, the inside of the vehicle-mounted camera module is sealed and easily heated. Therefore, in the video encoding device for encoding a video inputted from the in-vehicle cameras, it is difficult to have a large capacity DRAM (Dynamic Random Access Memory) outside the video encoding device due to thermal and space problems, and it is also difficult to have an SRAM having a capacity equivalent to that of the DRAM inside the video encoding device from the viewpoints of costs and the size of circuits. Therefore, the video encoding device 18 according to the present embodiment, which can encode a video using a small-capacity memory, can be optimally applied to a vehicle-mounted camera module.

Modified Example of First Embodiment

In the above explanation, a series of operations of the video encoding device 18 has been described under attention is paid to one MB. However, the video encoding device 18 may operate to perform the above-described series of processes in parallel in a pipelined manner for a plurality of MBs. As a result, the process of the video encoding device 18 can be improved.

Second Embodiment

Figure 10:
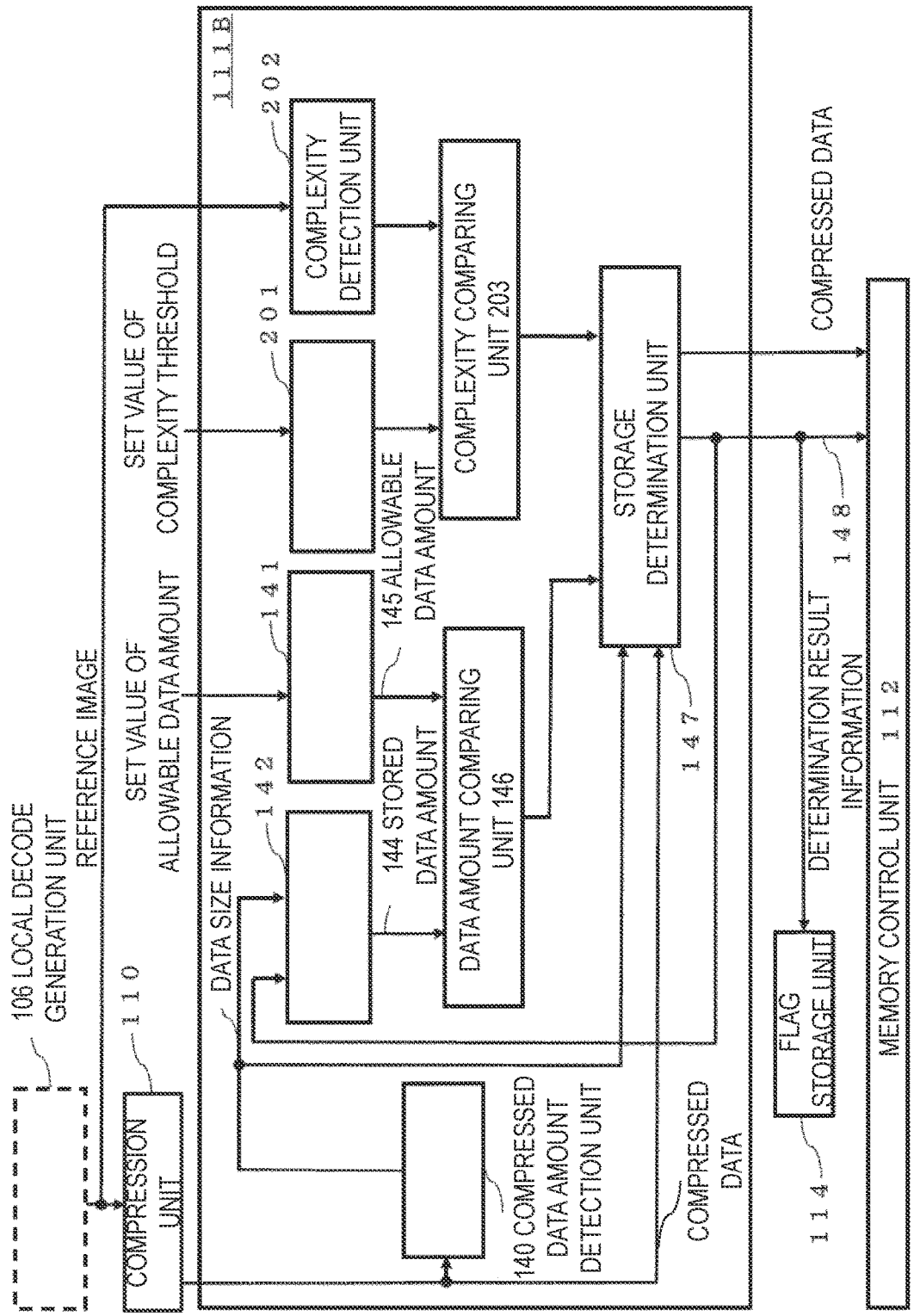
FIG. 10 is a block diagram showing an exemplary configuration of a reference image storage determination unit according to a second embodiment.

Next, the second embodiment will be described. FIG. 10 is a block diagram showing an exemplary configuration of the reference image storage determination unit 111B according to the second embodiment. As shown in FIG. 10, compared to the reference image storage determination unit described in first embodiment (see FIG. 4), the reference image storage determination unit 111B further includes a complexity threshold setting unit 201, a complexity detection unit 202, and a complexity comparing unit 203. Other configurations and operations are the same as those of the reference image storage determination unit 111 described in the first embodiment, and therefore, the same components are denoted by the same reference numerals, and duplicate descriptions are omitted.

Second embodiment differs from first embodiment in that when reference image storage determination unit 111B determines whether to store compressed data in reference image memory 113, it also adds the complexity of the reference image corresponding to compressed data to the criterion.

Here, the complexity of images is a parameter representing the degree of local non-flatness. For example, as an example of the parameter representing complexity, the parameter "spatial activity" of the MPEG-2 rate control model TM5 and the step 3 can be cited.

The spatial activity of the macroblock j consisting of four luminance subblocks of frame structures (n=1-4) and the four luminance subblocks of the field structure (n=5-8) is expressed by Equation 1.

$$act_j = 1 + \min(v_{blk_1}, v_{blk_2}, \ldots, v_{blk_8}) \quad \text{[Equation 1]}$$

$$v_{blk_n} = 1/64 \times \Sigma_{k=1}^{64}(P_k^n - P\_mean_n)^2 \quad \text{[Equation 2]}$$

$$P\_mean_n = 1/64 \times \Sigma_{k=1}^{64} P_k^n \quad \text{[Equation 3]}$$

$P_k^n$ stands for one of pixel values in the original block 8×8.

$P_{\_mean_n}$ stands for an average of pixel values in the original block 8×8.

$v_{blk_n}$ stands for variance. Therefore, spatial activity of macroblock is a parameter which stands for variation of pixel values in a macroblock.

Generally, when the complexity of images is high, intra-coding is preferable from the viewpoint of coding efficiency. Therefore, when judging whether or not to store compressed data in the reference image memory 113, the reference image storage determination unit 111B according to the second embodiment estimates whether or not the divided image (e.g., macroblock) to be encoded is intra-coding or inter-coding in the next frame based on the complexity of the reference image corresponding to the compressed data. Here, reference image storage determination unit 111B estimates, but does not determine, whether to perform intra-coding or inter-coding. That is, when the complexity of the reference image is large, it is determined that the compressed data corresponding to the reference image is not stored in the reference image memory 113, thereby indirectly prompting the intra-inter determination unit 103 to determine that the intra-coding is to be performed. The intra-coding or inter-coding is finally determined by the determination result of the intra-inter determination unit 103.

As shown in FIG. 10, in second embodiment, the local decode generation unit 106 transmits reference image to the complexity detection unit 202 in addition to the compression unit 110.

If the complexity of the reference image is larger than a predetermined threshold (hereinafter, sometimes referred to as a "complexity threshold"), the reference image storage determination unit 11B determines not to store the compressed data in the reference image memory 113. The complexity threshold setting unit 201 is configured to set complexity thresholds. For example, the complexity threshold setting unit 201 is composed of a writable register, which is set by the CPU 15 with executing the drivers of the video encoding device 18.

The complexity detection unit receives and analyzes the reference image from the local decode generation unit 106 and calculates the complexity of the reference image.

The complexity comparing unit 203 compares the complexity thresholds set in the complexity threshold setting unit 201 with the complexity of the reference image calculated by the complexity detection unit 202, and outputs the result of the comparison to the storage determination unit 147.

Figure 11:
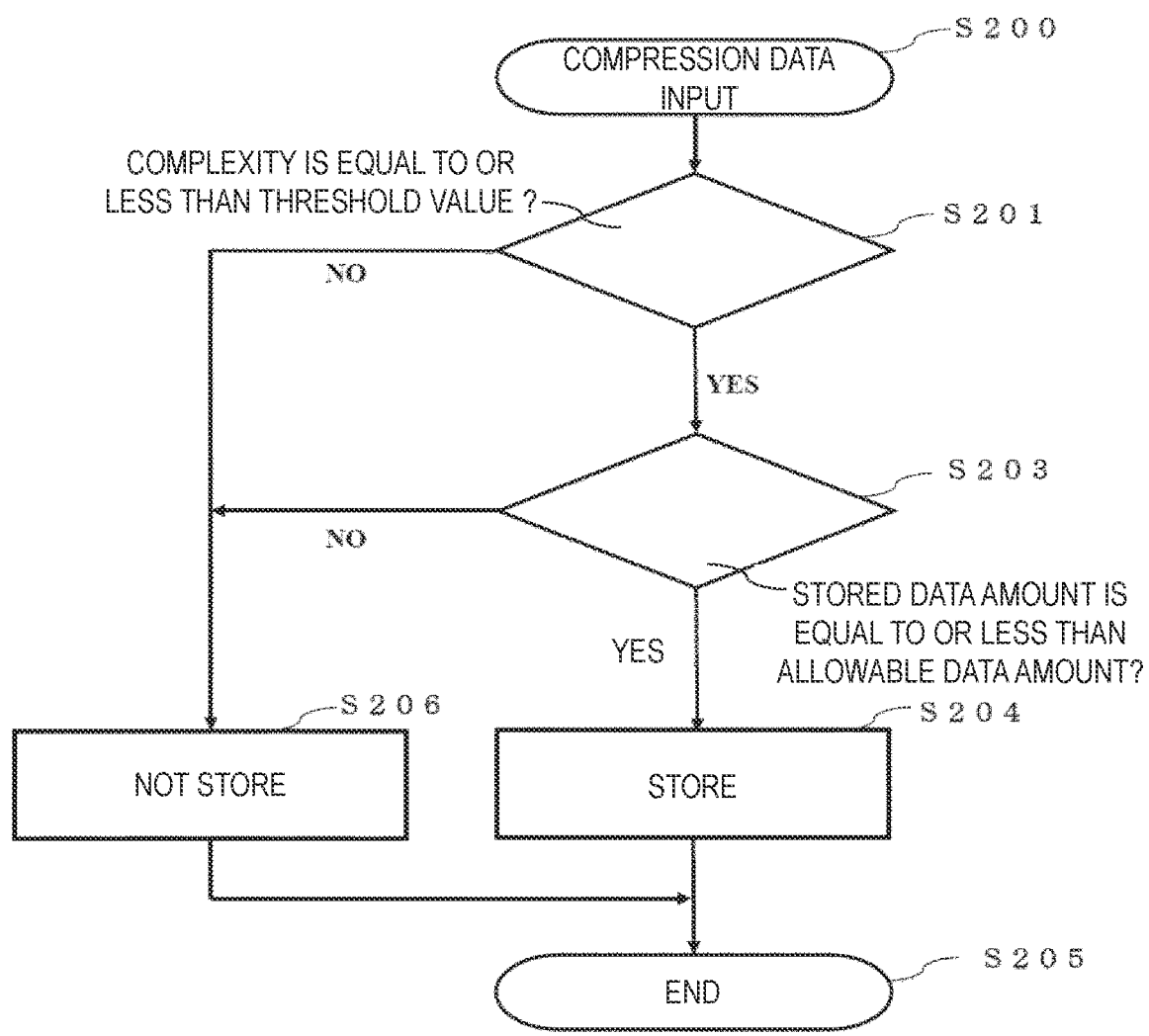
FIG. 11 is a flow chart showing an exemplary reference image storage determination process in the video encoding device according to the second embodiment.

FIG. 11 is a flow chart showing an exemplary reference image storage determination process in the video encoding device 18 according to the second embodiment.

As shown in FIG. 11, when the compressed data to be subjected to the storage determination is inputted to the reference image storage determination unit 111B (step S200), the complexity comparing unit 203 compares the complexity of the reference image with a predetermined complexity threshold (step S201). If the complexity of reference image is greater than the complexity thresholds (S201:NO), the compressed data corresponding to reference image is not stored in the reference image memory 113. That is, the storage determination unit 147 does not store the compressed data corresponding to reference image in the reference image memory 113 regardless of the magnitude relation between allowable data amount and stored data amount. The storage determination unit 147 transmits information indicating that the compressed data is not stored in the reference image memory 113 as the determination result information 148 to the memory control unit 112, the flag storage unit 114, and the stored data amount calculating unit 142. In this instance, the memory control unit 112 does not store the compressed data in the reference image memory 113. The flag storage unit 114 stores a flag (e.g., 0) indicating that storage is not possible. The stored data amount calculating unit 142 holds and stores the stored data amount according to the information indicating that the compressed data is not stored in the reference image memory 113 (step S206). After the processing of the memory control unit 112, the flag storage unit 114, and the stored data amount calculating unit 142, the processing of the reference image storage determination unit 111B ends (step S205).

On the other hand, when the complexity of the reference image is equal to or smaller than the threshold value (step S201:YES), the storage determination unit 147 determines whether or not to store the compressed data in the reference image memory 113 based on the comparison result of the data amount comparing unit 146. That is, the data amount comparing unit 146 compares the allowable data amount set in the allowable data amount setting unit 141 with the stored data amount transmitted from the stored data amount calculating unit 142 in step S203.

When stored data amount is equal to or less than allowable data amount, that is, when there is a remaining amount of memory (S203: Yes), the storage determination unit 147 transmits information indicating that the storage of compressed data in the reference image memory 113 is permitted to the memory control unit 112, the flag storage unit 114, and the stored data amount calculating unit 142 as the determination result information 148. The memory control unit 112 stores the compressed data in the reference image memory 113. The flag storage unit 114 stores a flag (e.g., 1) indicating that the reference image has been stored, and the length data of the compressed data. The stored data amount calculating unit 142 stores and holds the stored data amount 144 as the stored data amount (step S204). After the processing of the memory control unit 112, the flag storage unit 114, and the stored data amount calculating unit 142, the processing of the reference image storage determination unit 111B ends (step S205).

When stored data amount is larger than allowable data amount (step S203:NO), the storage determination unit 147 transmits information indicating that the storage of compressed data in the reference image memory 113 is not permitted as the determination result information 148 to the memory control unit 112, the flag storage unit 114, and the stored data amount calculating unit 142 (step S206). According to the second embodiment, the reference image storage determination unit 111B further includes a complexity threshold setting unit 201, a complexity detection unit 202, and a complexity comparing unit 203 as compared with the reference image storage determination unit 111 of the first embodiment. Therefore, when the complexity comparing unit 203 outputs a comparison result indicating that the complexity of the reference image detected by the complexity detection unit 202 is larger than the complexity threshold set in the complexity threshold setting unit 201, the reference image storage determination unit 111B determines that the compressed data corresponding to the reference image is not stored in the reference image memory 113. Therefore, the video encoding device 18 can optimize the reference image to be stored in the reference image memory 113 by not storing the reference image having a large complexity which is not suitable for the inter-coding in the reference image memory 113. That is, the video encoding device 18 can store only the reference image for which inter-prediction is estimated to be appropriate in the reference image memory 113. As a result, the coding rate of the video encoding device 18 can be improved, and the image quality can be improved.

Third Embodiment

Next, the third embodiment will be described. Third embodiment differs from first embodiment in that it has an intra refresh function and that it makes the size of an intra refresh target region (hereinafter referred to as an "intra-refresh region") variable.

Generally, there is a function called intra-refresh. This function forcibly performs intra-coding on a fixed area whose position changes for each frame, thereby preventing the propagation of a predicted error among frames and improving the image quality. In third embodiment, the size of the intra-refresh area is changed in accordance with the number of reference image that cannot be stored in the reference image memory 113.

Figure 12:
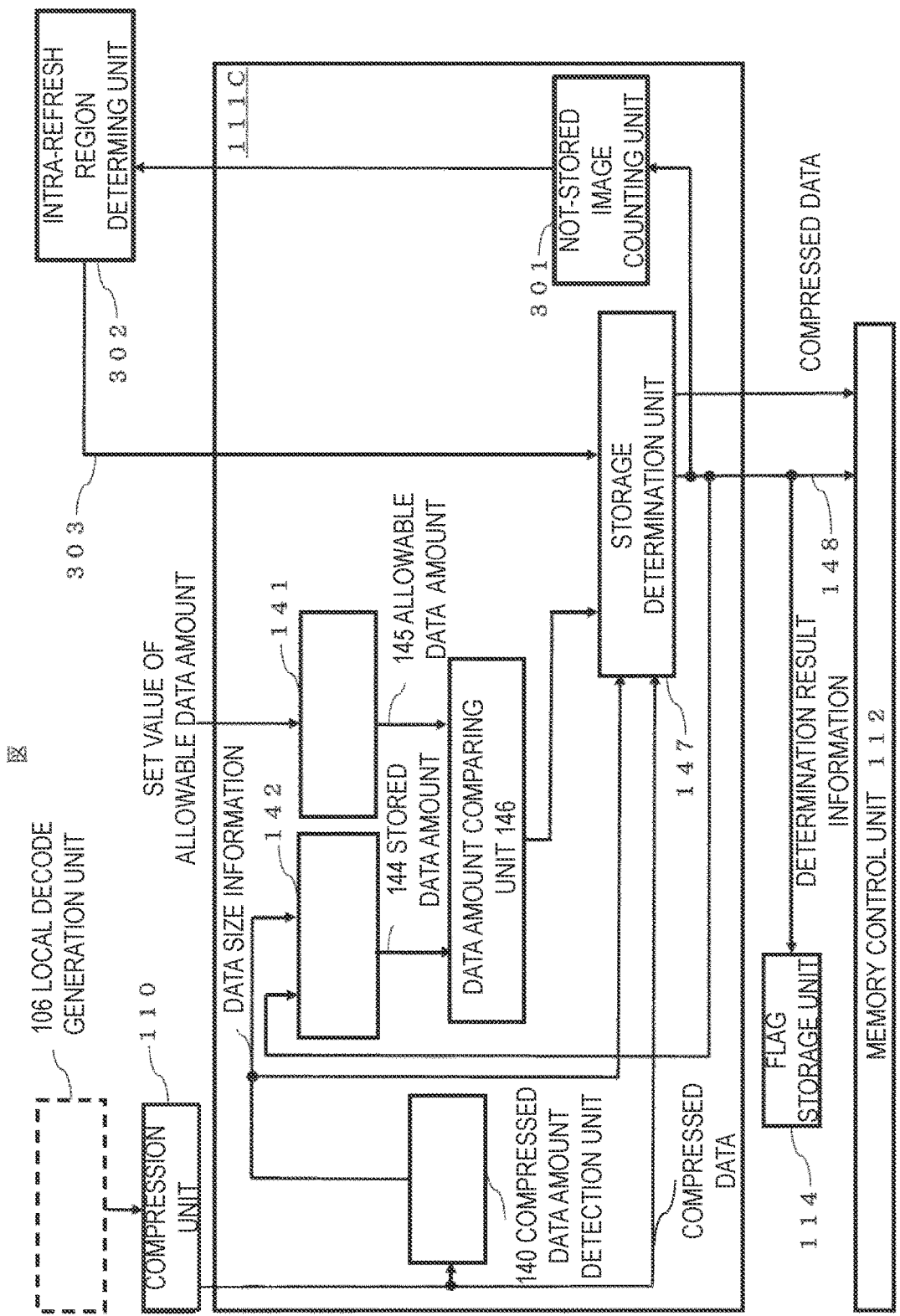
FIG. 12 is a block diagram showing an exemplary configuration of a video encoding device according to a third embodiment.

FIG. 12 is a block diagram showing an exemplary configuration of a video encoding device according to the third embodiment. As shown in FIG. 12, the third embodiment differs from the first embodiment (see FIGS. 3 and 4) in that the reference image storage determination unit 111C includes the not-stored image counting unit 301, the video encoding device 18 includes the intra-refresh region determination unit 302, and the control signals 303 are transmitted from the intra-refresh region determination unit 302 to the storage determination unit 147. Other configurations and operations are the same as those of the video encoding device 18 and the reference image storage determination unit 111 described in the first embodiment, and therefore, the same reference numerals are assigned to the same configurations, and duplicate descriptions are omitted.

The not-stored image counting unit 301 counts the number of reference image for which compressed data could not be stored in the reference image memory 113. The not-stored image counting unit 301 is initialized prior to starting the coding processing of the unit area or upon completion of the coding processing of the unit area.

In present embodiment, the video encoding device 18 further comprises an intra-refresh region determination unit 302. In the following frame, the intra-refresh region determination unit 302 determines the sizes and positions of intra-refresh areas to be forcibly intra-coding. The intra-refresh region determination unit 302 adjusts the size of the intra-refresh area based on the number of divided images (e.g., macroblocks) that cannot be stored in the reference image memory 113 transmitted from the not-stored image counting unit 301.

Figure 13:
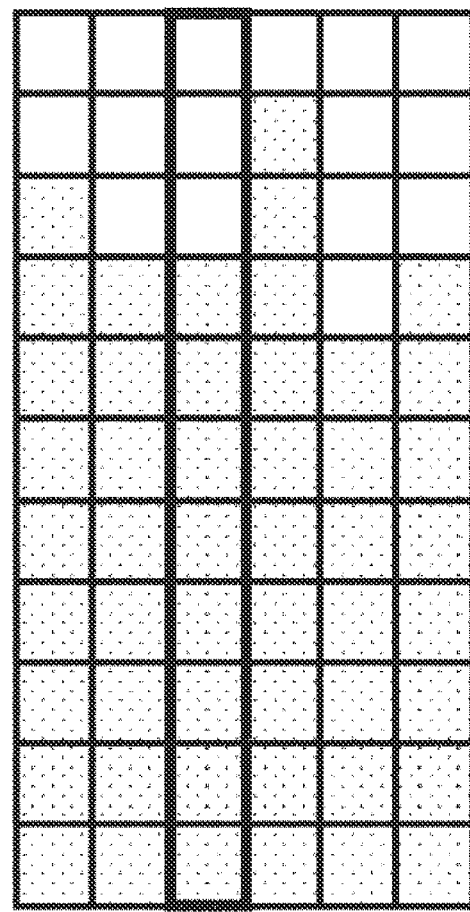
FIG. 13 is a diagram illustrating an exemplary reference image storage result by video encoding device according to the first embodiment.

FIG. 13 is a diagram illustrating an exemplary reference image storage result by the video encoding device 18 according to the first embodiment. As shown in FIG. 5, the divided images (rectangular blocks) are encoded from left to right in the same line. Therefore, when the unit area is 1 macroblock line (1MBL), as shown in FIG. 13, the MBs located on the left side of the macroblock line can easily store the compressed data obtained by compressing the reference image in the reference image memory 113. On the other hand, in the MB located on the right side of the macroblock line, the compressed data obtained by compressing the reference image is hardly stored in the reference image memory 113. Therefore, when only the remaining memory capacity of the reference image is used as a criteria for determining whether or not to store the reference image in the reference image memory 113, there is a problem that a deviation occurs in the position of the MB that can be subjected to inter-coding within one frame. The video encoding device 18 according to the third embodiment solves the problems that the position of the MBs that can be coded by inter-coding is biased by variably controlling the intra-refresh area.

Figure 14:
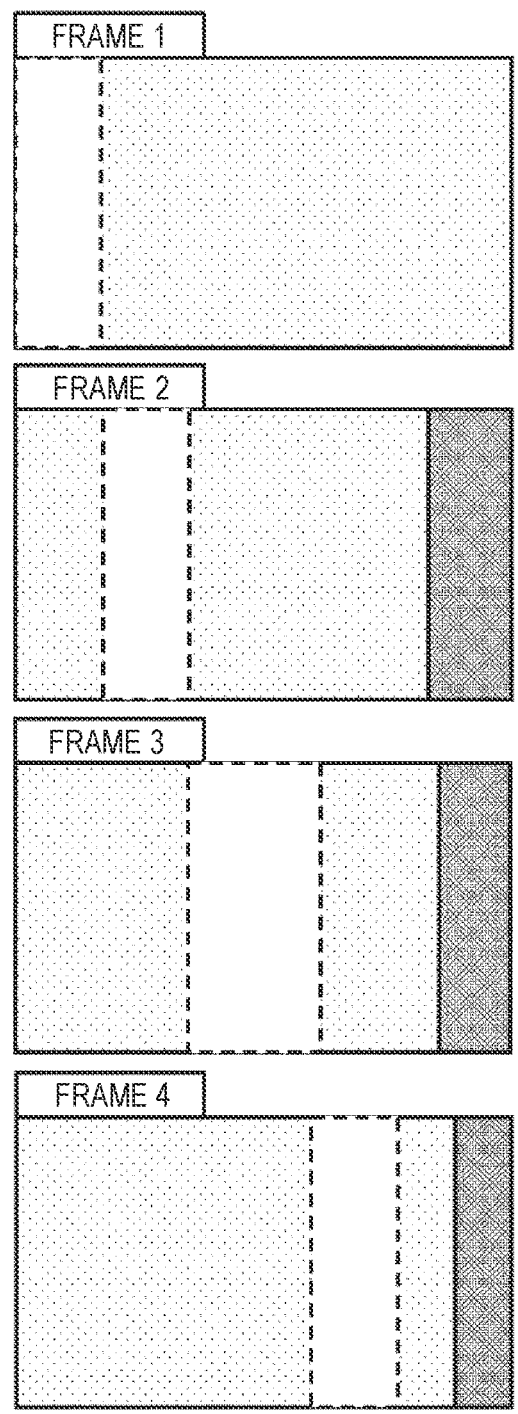
FIG. 14 is a diagram illustrating an exemplary operation of the video encoding device according to the third embodiment.

FIG. 14 is a diagram illustrating an exemplary operation of the video encoding device 18 according to the third embodiment. In the video encoding device 18 according to the present embodiment, the not-stored image counting unit 301 receives the determination result information 148 outputted from the storage determination unit 147. If the determination result information 148 is informed not to store the compressed data in the reference image memory 113, the not-stored image counting unit 301 counts up. For example, when the unit area is 1 macroblock line, the not-stored image counting unit 301 counts the number of MBs that could not be stored in the reference image memory 113. When the process of the unit area is completed, the not-stored image counting unit 301 transmits the sum of the numbers of MBs that have not been stored to the intra-refresh region determination unit 302.

The intra-refresh region determination unit 302 determines the size of the intra-refresh area based on the sum of the number of MBs that have not been stored. For example, when there is an MB that has not been stored, the size of the intra refresh area is increased. Conversely, when there is no MB that has not been stored, the size of the intra-refresh area may be reduced. The intra-refresh region determination unit 302 transmits the determined sizes and positions of the intra-refresh area to the storage determination unit 147 as a control signal 303.

When the compressed data is included in the intra-refresh area, the storage determination unit 147 determines not to store the compressed data in the reference image memory 113. On the other hand, when compressed data is not included in the intra-refresh area, the storage determination unit 147 determines whether or not to store compressed data in the reference image memory 113 based on the comparison result outputted by the data amount comparing unit 146.

According to the third embodiment, the video encoding device 18 further includes a not-stored image counting unit 301 and an intra-refresh region determination unit 302. The intra-refresh region determination unit 302 determines the size of the intra-refresh area in accordance with the number of MBs that could not be stored in the reference image memory 113 counted by the not-stored image counting unit 301. Therefore, the size of the intra-refresh area can be changed according to the number of images not stored in the reference image memory 113. The compressed data corresponding to the reference image of the divided images (e.g., MBs) in the intra-refresh area need not be stored in the reference image memory 113. Therefore, in the video encoding device 18 according to the third embodiment, the number of compressed data (the number of reference images) stored in the reference image memory 113 can be reduced by adjusting the size of the intra-refresh area. As a result, the shortage of the remaining capacity of the reference image memory 113 at the right end of the frame (right end of the unit area) can be reduced. Further, since the position of the intra-refresh area differs for each frame, the bias of the position of the intra-coding and inter-coding macroblocks can be eliminated for the entire frame. In this manner, the video encoding device 18 according to the third embodiment can eliminate the deviation of the position of the intra-coding and inter-coding macroblocks, and can improve the image quality.

Fourth Embodiment

Next, fourth embodiment will be described. In order to optimize the reference image stored in the reference image memory 113, fourth embodiment differs from the first to third embodiment in that even if reference image has been stored in the reference image memory, it is replaced with a more appropriate reference image.

Figure 15:
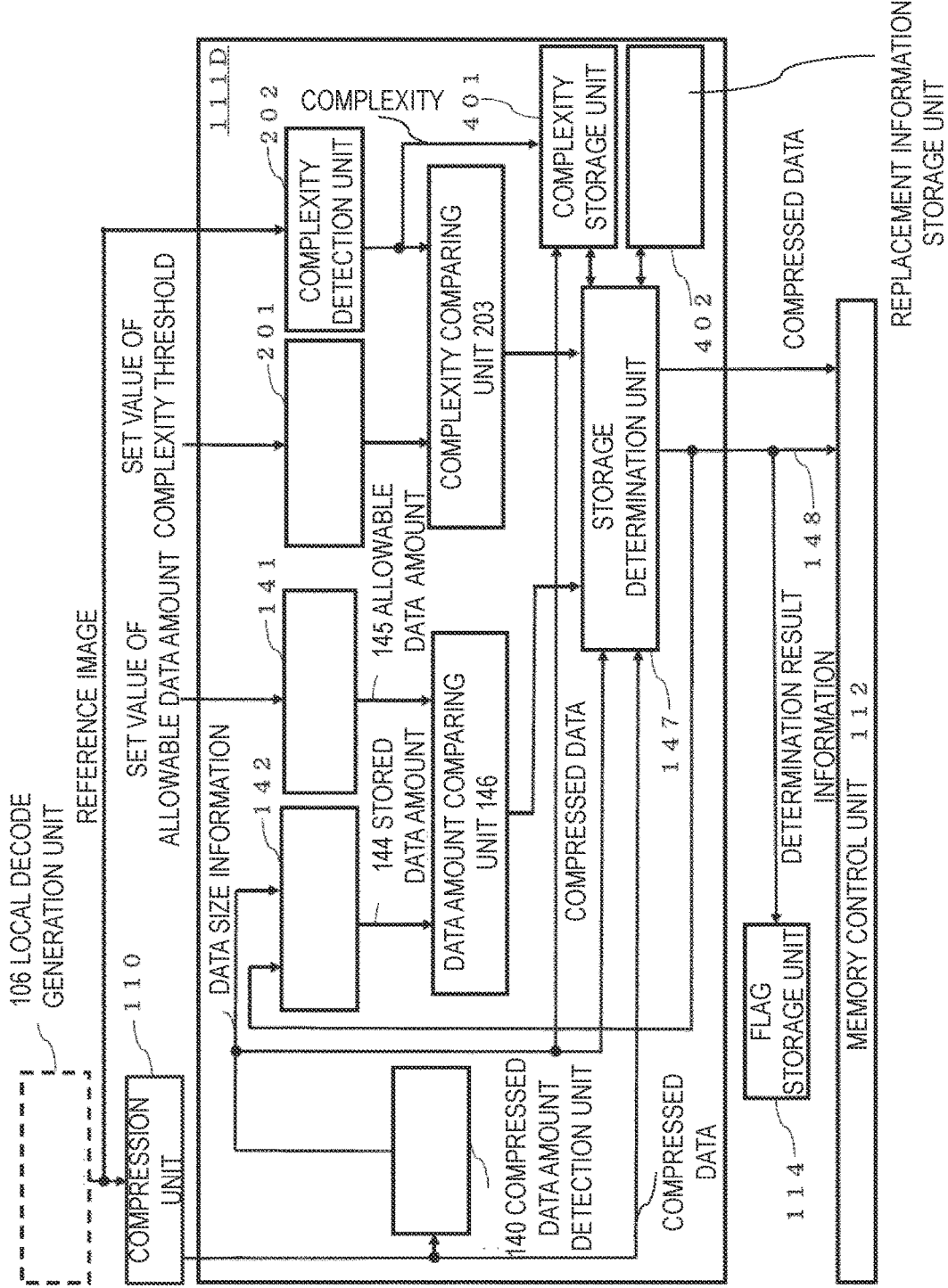
FIG. 15 is a block diagram showing an exemplary configuration of a video encoding device according to a fourth embodiment.

FIG. 15 is a block diagram showing an exemplary configuration of a video encoding device according to the fourth embodiment. The video encoding device 18 according to the fourth embodiment differs from the reference image storage determination unit 111B (see FIG. 10) described in the second embodiment in that the reference image storage determination unit 111D further includes a complexity storage unit 401 and a replacement information storage unit 402. Other configurations and operations are the same as those of the reference image storage determination unit 111B described in the second embodiment, and therefore, the same reference numerals are assigned to the same configurations, and duplicate descriptions are omitted.

When the compressed data corresponding to the reference image is stored in the reference image memory 113, the complexity storage unit 401 stores the complexity of the corresponding reference image.

After storing the compressed data corresponding to the reference image in the reference image memory 113, the storage determination unit 147 replaces the compressed data stored in the reference image memory 113 when a more appropriate reference image appears.

When the storage determination unit 147 performs a process of replacing reference image, the replacement information storage unit 402 stores the information of the reference image prior to the replacement and the information of the reference image after the replacement.

Figure 16:
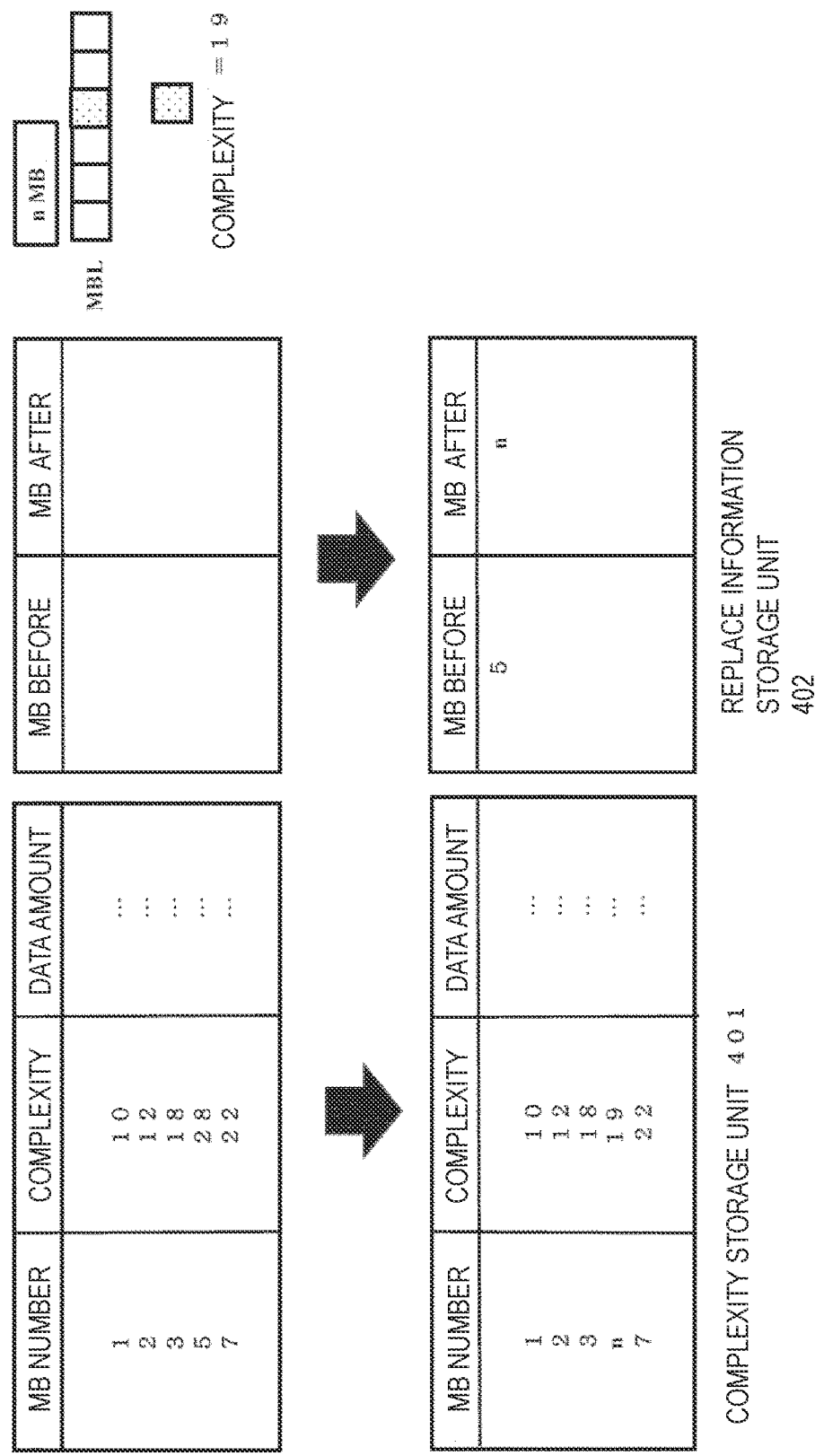
FIG. 16 is a diagram showing examples of data stored in the complexity storage unit and the replacement information storage unit related to the fourth embodiment.

FIG. 16 is a diagram showing examples of data stored in the complexity storage unit 401 and the replacement information storage unit 402 according to the present embodiment. In present embodiment, the unit area is described as 1 macroblock line (MBL) As an example, the possible values of complexity are assumed to be 0-63.

The complexity storage unit 401 stores the macroblock number of the compressed data stored in the reference image memory 113 and the complexity of the reference image. For example, in FIG. 16, it is stored in the complexity storage unit 401 that the reference image of the macroblock number 1 with the complexity 10, the reference image of the macroblock number 2 with the complexity 12, the reference image of the macroblock number 3 with the complexity 18, the reference image of the macroblock number 5 with the complexity 28, and the reference image of the macroblock number 7 with the complexity 22 have been stored in the reference image memory 113.

Figure 17:
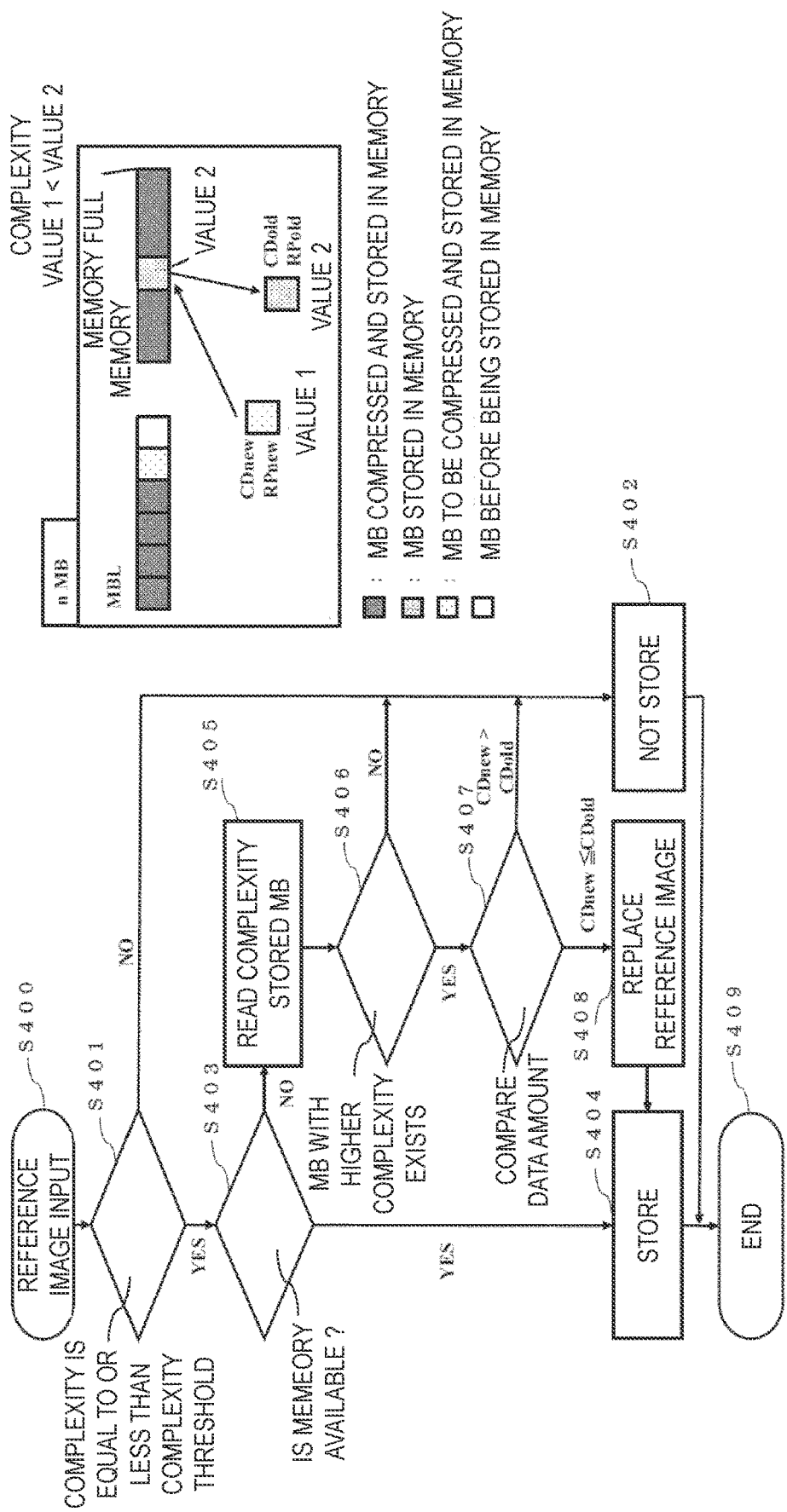
FIG. 17 is a flow chart showing an exemplary reference image storage determination process in the video encoding device according to the fourth embodiment.

FIG. 17 is a flow chart showing an exemplary reference image storage determination process in the video encoding device 18 according to the fourth embodiment. As shown in FIG. 17, when reference image and compressed data are entered into the reference image storage determination unit 111D (step S400), the complexity comparing unit 203 compares the complexity of the reference image with predetermined thresholds (step S401). If the complexity of reference image is greater than the complexity thresholds (step S401: NO), the storage determination unit 147 determines not to store the compressed data in the reference image memory 113 (step S402). That is, the storage determination unit 147 determines not to store compressed data in the reference image memory 113 regardless of the magnitude relation between allowable data amount and stored data amount. The storage determination unit 147 transmits information indicating that the compressed data is not stored in the reference image memory 113 as the determination result information 148 to the memory control unit 112, the flag storage unit 114, and the stored data amount calculating unit 142.

On the other hand, when the complexity of the reference image is equal to or smaller than the complexity threshold (step S401:YES), the data amount comparing unit 146 compares the allowable data amount set in the allowable data amount setting unit 141 with the stored data amount transmitted from the stored data amount calculating unit 142 (step S403). When stored data amount is equal to or smaller than allowable data amount, that is, when there is a remaining memory capacity (step S403:YES), the storage determination unit 147 transmits a determination result information 148 for storing compressed data in the reference image memory 113 to the memory control unit 112, the flag storage unit 114, and the stored data amount calculating unit 142 based on the comparison result of the data amount comparing unit 146 (step S404), and ends the storage determination process (step S409).

On the other hand, if stored data amount is larger than allowable data amount (step S403:NO), the storage determination unit 147 reads the complexity of the stored divided images (e.g., macroblocks) from the complexity storage unit 401 (step S405). Here, the compressed data to be determined whether being stored or not is referred to as CDnew, the reference image corresponding to CDnew is referred to as RPnew, the stored compressed data is referred to as CDold, and the reference image corresponding to CDold is referred to as RPold. If a reference image RPold having a larger complexity than RPnew is not found (step S406:NO), the storage determination unit 147 determines that the compressed data CDnew is not stored in the reference image memory 113 (step S402).

If a reference image RPold with a larger complexity is found (step S406: YES) compared to the complexity of the reference image RPnew, the storage determination unit 147 compares the data sizes of the compressed data CDnew and the compressed data CDold (step S407). When the data amount of the compressed data CDnew is larger than the data amount of the stored compressed data CDold, the memory capacity of the reference image memory 113 is insufficient. Therefore, the storage determination unit 147 determines that the compressed data CDnew is not stored in the reference image memory 113 (step S402). On the other hand, when the data amount of the compressed data CDnew is equal to or smaller than the data amount of the stored compressed data CDold, the storage determination unit 147 writes information indicating that the reference image is to be replaced in the replacement information storage unit 402 (step S408). Next, the storage determination unit 147 transmits information indicating that the compressed data CDnew is to be stored in the reference image memory 113 as the determination result information 148 to the memory control unit 112, the flag storage unit 114, and the stored data amount calculating unit 142 (step S404), and ends the process (step S409).

The storage determination unit 147 transmits the information stored in the replacement information storage unit 402 to the flag storage unit 114 and updates the information stored in the flag storage unit 114 every time the compressed data is replaced or after the compressed data storage determination is completed for all the MBs of the 1MBL.

When a plurality of reference images RPold having a larger complexity than the complexity of the reference image RPnew are found in step S406, the storage determination unit 147 compares the data amount of the stored compressed data having the largest data amount among the plurality of replacement candidates with the data amount of the compressed data CDnew in step S407, and makes the stored compressed data having the largest data amount a replacement target. When a plurality of reference images RPold having a larger complexity than the complexity of the reference image RPnew are found, the storage determination unit 147 may search for the compressed data CDold having a data amount equal to or less than the data amount of the compressed data CDnew in descending order of the complexity of the reference image RPold.

The complexity values stored in the complexity storage unit 401 may be simplified according to the size of the complexity storage unit 401. This is exemplified when the possible values of complexity are 0 to 63. In this instance, for example, when complexity is 0 to 15, the value C of the picture image complexity stored in the complexity storage unit 401 is 0, when complexity is 16 to 31, the value C is 1, when complexity is 32 to 47, the value C is 2, and when complexity is 48 to 63, the value C is 3.

In this manner, by setting the same value C for a certain range of complexity, it is possible to reduce the number of bits required for expressing the complexity in the complexity storage unit 401. Therefore, the size of the circuits required for the complexity storage unit 401 can be reduced. Also, if the possible values of complexity are made as small as 0 to 63, the time required for searching the stored compressed data CDold to be replaced increases. Therefore, by reducing the possible values of complexity, such as the value C, it is possible to reduce the times required for searching the stored reference image RPold and compressed data CDold. Therefore, the throughput of the reference image storage determination unit 111D can be improved.

According to the fourth embodiment, the reference image storage determination unit 111D further comprises a complexity storage unit 401 and a replacement information storage unit 402 compared to the reference image storage determination unit 111B of the second embodiment. Therefore, the video encoding device 18 can replace the reference image to be stored as needed based on the data sizes and the complexity of the compressed data of the reference image, and can further optimize the data sizes. As a result, the video encoding device 18 can further improve the coding efficiency and the image quality.

Fifth Embodiment

Fifth embodiment is a vehicle on which a video encoding device 18 relating to first embodiment to fourth embodiment is mounted. In the vehicle according to the present embodiment, the video encoding device 18 variably adjusts the memory usage according to the driving mode of the vehicle.

Figure 18:
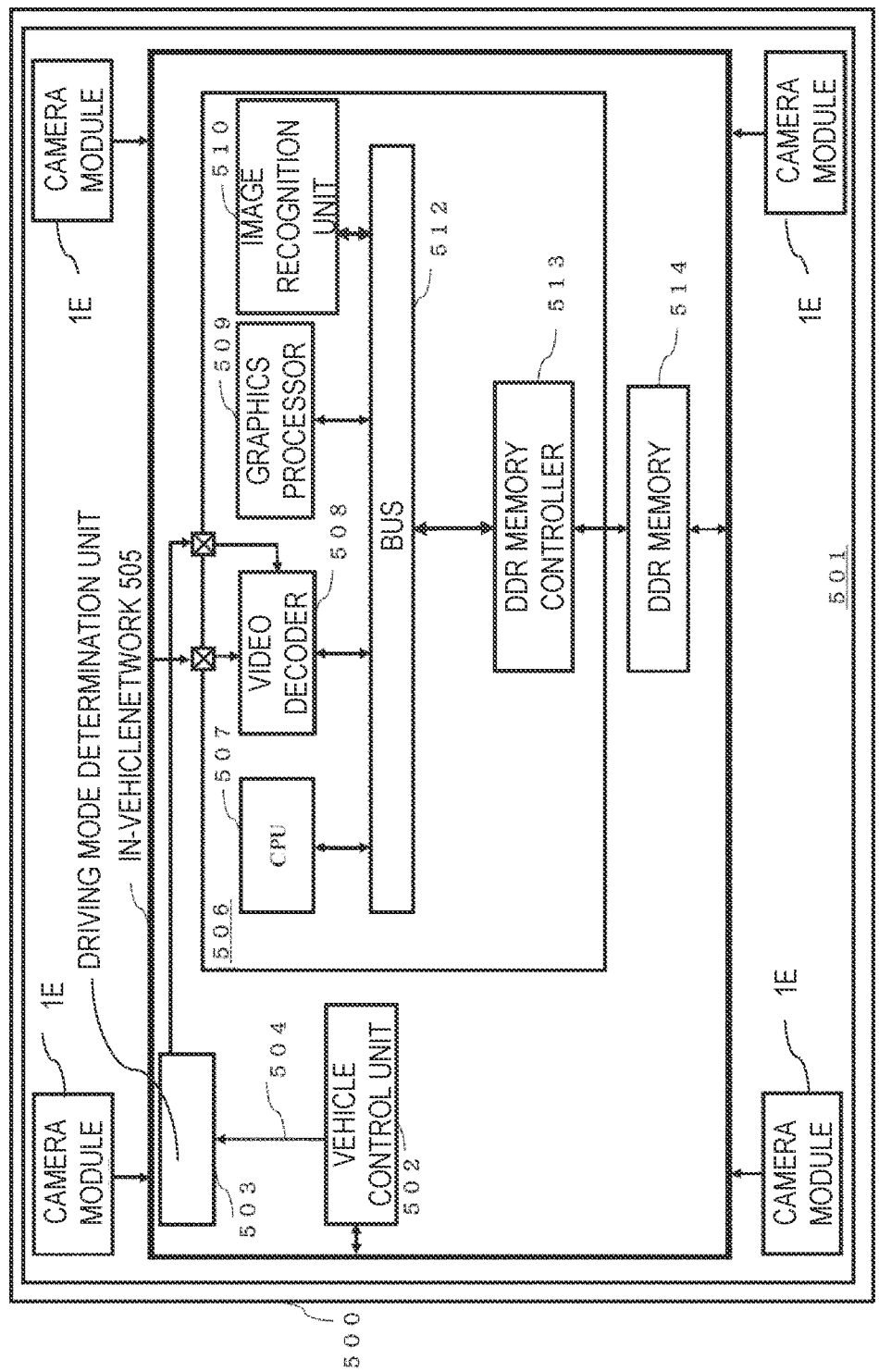
FIG. 18 is a block diagram showing an exemplary configuration of a vehicle control system according to a fifth embodiment.

FIG. 18 is a block diagram showing an exemplary configuration of a vehicle control system in which the video encoding device 18 is mounted. The video encoding device mounted on the present embodiment switches whether or not to losslessly compress the reference image used for inter-prediction according to driving mode.

As shown in FIG. 18, a vehicle control system 501 is mounted on a vehicle 500. The vehicle control system 501 includes one or more camera modules 1E, a vehicle control unit 502, a driving mode determination unit 503, an in-vehicle network 505, and a semiconductor device 506.

Vehicles 500 include at least two distinct driving mode. That is, the vehicle 500 includes a manual driving mode by a human being, which is a first driving mode, and an automated driving mode, which is a second driving mode. In FIG. 18, four camera modules 1E are provided in the right front, left front, right rear, and left rear of the vehicle 500, but the number of camera modules 1E provided in the vehicle 500 is not limited to four.

The vehicle control unit 502 performs various controls of the vehicle. For example, the vehicle control unit controls the gears and the running speeds of the vehicle 500.

The driving mode determination unit 503 determines whether the driving mode of the vehicle 500 is the manual driving mode or the automated driving mode based on the vehicle control information 504 outputted from the vehicle control unit 502. Here, the vehicle control information 504 may be, but is not limited to, driving mode control instruction information that the driver of the vehicle 500 gives to the vehicle 500. For example, the vehicle control information 504 may be gear information of the vehicle 500, speed information of the vehicle 500, or a driving place, for example, on a highway.

The in-vehicle network 505 may be a wired network or a radio network.

The semiconductor device 506 further comprises a CPU 507, a video decoder 508, a graphics processor 509, an image recognition unit 510, a bus 512, and a DDR memory controller 513.

The CPU 507 executes programs and controls the entire semiconductor device 506.

The video decoder 508 decodes the bitstream BSout received from the camera modules 1E.

The graphics processor 509 performs an image process on the image decoded by the video decoder 508. For example, the graphics processor 509 performs an enlargement and reduction process on the images decoded by the video decoder 508.

The image recognition unit 510 performs an image recognizing process based on the image decoded by the video decoder 508. For example, the image recognition unit 510 recognizes other vehicles, people, traffic lights, and road signs, and writes the image recognition result to the DDR memory 514 via the DDR memory controller 513.

The DDR memory controller 513 receives a write request to the DDR memory 514 and a read request from the DDR memory 514 from the bus master (for example, the CPU 507 or the image recognition unit 510), and controls a write access to the DDR memory 514 and a read access from the DDR memory 514.

The DDR memory 514 is a solid-state storage device that stores programs to be processed by the CPU 507, data inputted to the video decoder 508, the graphics processor 509, and the image recognition unit 510, temporary data, and processing results.

Figure 19:
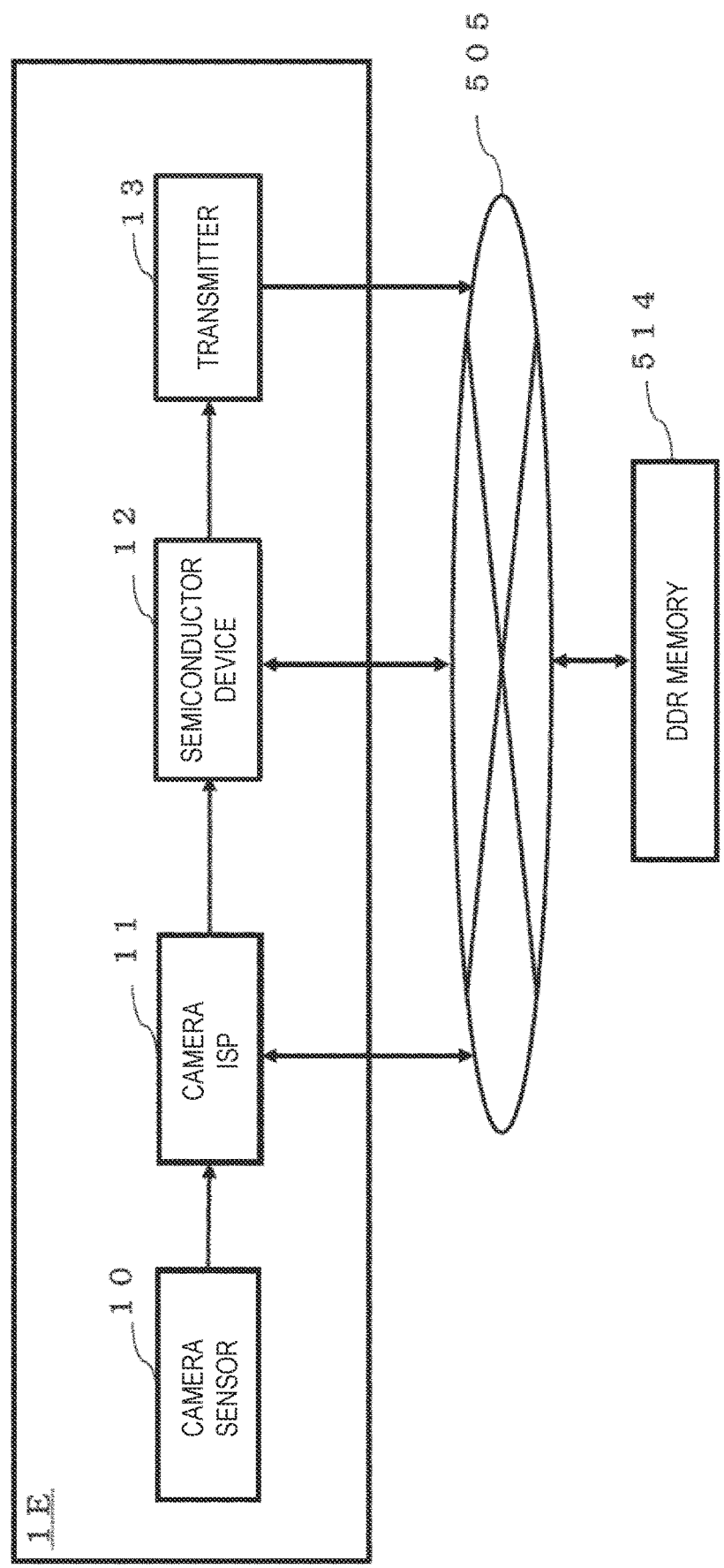
FIG. 19 is a block diagram showing an exemplary configuration of a camera module according to the fifth embodiment.

FIG. 19 is a block diagram showing an exemplary configuration of a camera module 1E according to the present embodiment. In present embodiment, the semiconductor device 12 does not have a built-in SRAM and uses the DDR memory 514 as a storage device.

When the vehicle 500 according to the present embodiment runs in the automated driving mode, the vehicle 500 needs to be controlled after recognizing the surrounding conditions of the vehicle 500, for example, running lanes, signals, road signs, other vehicles, and pedestrians. Therefore, the vehicle control unit 502 and the semiconductor device 506 need to perform a large amount of information processing, and use a large amount of memories on the DDR memory 514.

On the other hand, when driving in the manual driving mode by the driver, the driver himself or herself of the vehicle 500 recognizes the peripheral condition of the vehicle 500. Thus, vehicle control unit 502 and semiconductor device 506 use only a small volume of DDR memory 514 compared to an automated driving mode.

The video encoding device 18 according to the present embodiment can variably adjust the volume of the DDR memory to be used according to the driving mode of the vehicle. For example, the video encoding device 18 can switch on and off the function of losslessly compressing the reference image according to the driving mode of the vehicle. The video encoding device 18 can also adjust the number of reference image stored in the DDR memory 514 according to the amount of available memory.

When lossless compression is off, the memory capacity of the reference image memory is large, so that reference image can be stored for all divided images (e.g., macroblocks). The video encoding device 18 can optimally select a macroblock to be intra-coding or inter-coding without being limited to a memory capacity. Therefore, the coding efficiency is improved, and the image quality is improved. On the other hand, when the function of losslessly compressing reference image is on, the reference image storage determination unit 111 in the video encoding device 18 determines whether or not to store the compressed data of the reference image in the reference image memory 113 based on the determination methods relating to first embodiment to fourth embodiment because the memory capacity cannot be sufficiently secured. Therefore, the video encoding device 18 can encode the inputted video DVin while suppressing the image quality degradation. That is, since the vehicle 500 has the driving mode determination unit 503, the video encoding device 18 can be caused to perform optimum video coding according to the driving mode of the vehicle 500.

Although the invention made by the present invention has been specifically described based on the embodiments described above, the present invention is not limited to the embodiments already described, and various modifications can be made without departing from the gist thereof. For example, third embodiment can be combined with second embodiment, a fourth embodiment, or fifth embodiment.

Further, in the explanation of first embodiment 4, when the coding process of the unit area (e.g., MBL) is performed, the reference image is stored in the reference image memory 113 for each of the divided images (e.g., MB). However, the reference image may be stored in the reference image memory 113, for example, after determining whether or not to store all the divided images (e.g., all the MBs) included in the unit area in the reference image memory 113, all the divided images may be stored in the unit area. That is, the storage of the reference image in the reference image memory 113 may be performed collectively after determining whether or not all MBs in the 1MBL can be stored in the reference image memory 113.

What is claimed is:

1. A vehicle comprising:
a camera for outputting video data;
a video encoding device for inputting the data outputted from the camera; and
a memory,
wherein the video encoding device includes:
   an image coding unit for performing prediction coding by determining a difference between a divided image to be subjected to prediction coding and a reference image;
   a local decode generation unit for generating a reference image based on a coding result of the divided image;
   a compression unit for compressing the reference image to generate compressed data;
   an allowable data amount setting unit for setting an allowable data amount of the compressed data stored in a memory for each predetermined area of the video data;
   a reference image storage determination unit for determining whether or not to store the compressed data in the memory; and
   an inter-prediction unit for performing motion vector search based on the reference image stored in the memory for inter coding,
wherein the reference image storage determination unit determines whether or not to store the compressed data in the memory based on the allowable data amount, and store the compressed data in the memory based on a determination result that the compression data is stored in the memory,
wherein the inter-prediction unit searches for the reference image corresponding to the compressed data stored in the memory for motion vector search,
wherein the video encoding device changes an amount of the memory to be used according to a driving mode,
wherein the vehicle includes a first driving mode and a second driving mode that differs from the first driving mode as the driving mode,
wherein the video encoding device uses a first amount of the memory in the first driving mode in which the vehicle runs in automatic operation,
wherein the video encoding device uses a second amount of the memory in the second driving mode in which the vehicle runs in manual operation, and
wherein the first amount of the memory is less than the second amount of the memory.

2. The vehicle according to claim 1,
wherein a lossless compression function of the video encoding device is enabled in the first driving mode,
wherein the allowable data amount is adjusted according to the first amount of the memory, and
wherein the lossless compression function of the video encoding device is disabled in the second driving mode.

* * * * *